United States Patent
Moeller et al.

(10) Patent No.: US 11,590,934 B2
(45) Date of Patent: Feb. 28, 2023

(54) VEHICULAR SAFETY MONITORING

(71) Applicant: KEEP TECHNOLOGIES, INC., Atlanta, GA (US)

(72) Inventors: David Moeller, Atlanta, GA (US); Jonathan Manuzak, Atlanta, GA (US); Ian Mathews, Atlanta, GA (US); Rahul Maran, Atlanta, GA (US); Nick Allison, Atlanta, GA (US)

(73) Assignee: Keep Technologies, Inc., Atlanta, GA (US)

( * ) Notice: Subject to any disclaimer, the term of this patent is extended or adjusted under 35 U.S.C. 154(b) by 0 days.

(21) Appl. No.: 17/584,254

(22) Filed: Jan. 25, 2022

(65) Prior Publication Data
US 2022/0161761 A1 May 26, 2022

Related U.S. Application Data

(63) Continuation-in-part of application No. 17/157,369, filed on Jan. 25, 2021, which is a continuation of
(Continued)

(51) Int. Cl.
*B60R 25/31* (2013.01)
*B60R 25/30* (2013.01)
(Continued)

(52) U.S. Cl.
CPC ............... *B60R 25/31* (2013.01); *B60R 1/00* (2013.01); *B60R 11/00* (2013.01); *B60R 25/04* (2013.01);
(Continued)

(58) Field of Classification Search
CPC ........... B60R 25/31; B60R 1/00; B60R 11/00; B60R 25/1003; B60R 25/102;
(Continued)

(56) References Cited

U.S. PATENT DOCUMENTS 5,438,311 A * 8/1995 Lane, Sr. ................ B60R 25/10
340/426.26
5,482,314 A * 1/1996 Corrado ............ B60R 21/01536
701/45
(Continued)

FOREIGN PATENT DOCUMENTS

WO WO-2018046020 A1 * 3/2018 ............... A47D 1/00
WO WO-2018138728 A1 * 8/2018 ............. B60N 2/002

*Primary Examiner* — Jaime Figueroa
(74) *Attorney, Agent, or Firm* — Morris, Manning & Martin, LLP; Daniel E. Sineway, Esq.; Adam J. Thompson, Esq.

(57) ABSTRACT

Disclosed herein is a vehicle theft prevention device. The device can include a data store including event configuration data. The device can include one or more sensors that can sense various types of measurements proximate to a vehicle. The device can include a computing device in communication with the sensors. The computing device can read measurements from the sensors and determine that a particular event has occurred. The computing device can analyze the measurements to determine the particular event occurred based on the event configuration data. When the particular event occurs, the computing device can perform one or more remedial actions.

20 Claims, 13 Drawing Sheets

Related U.S. Application Data application No. 16/988,447, filed on Aug. 7, 2020, now Pat. No. 10,899,317.

(60) Provisional application No. 63/141,248, filed on Jan. 25, 2021, provisional application No. 62/883,875, filed on Aug. 7, 2019.

(51) Int. Cl.

| | | |
|---|---|---|
| *B60R 25/25* | (2013.01) | |
| *B60R 25/10* | (2013.01) | |
| *B60R 25/102* | (2013.01) | |
| *B60R 11/00* | (2006.01) | |
| *B60R 25/34* | (2013.01) | |
| *G01B 17/00* | (2006.01) | |
| *G01J 5/00* | (2022.01) | |
| *G01P 13/00* | (2006.01) | |
| *B60R 25/24* | (2013.01) | |
| *G06F 3/01* | (2006.01) | |
| *G06F 3/16* | (2006.01) | |
| *G06F 8/65* | (2018.01) | |
| *G06F 21/57* | (2013.01) | |
| *G06Q 20/10* | (2012.01) | |
| *G06Q 20/32* | (2012.01) | |
| *G06Q 20/40* | (2012.01) | |
| *G06Q 30/0601* | (2023.01) | |
| *H04L 9/06* | (2006.01) | |
| *H04L 9/08* | (2006.01) | |
| *H04L 9/32* | (2006.01) | |
| *H04W 4/021* | (2018.01) | |
| *B60R 25/32* | (2013.01) | |
| *B60R 25/33* | (2013.01) | |
| *G01V 11/00* | (2006.01) | |
| *G06T 7/174* | (2017.01) | |
| *B60R 25/04* | (2013.01) | |
| *G07C 9/00* | (2020.01) | |
| *B60R 25/40* | (2013.01) | |
| *G08B 21/18* | (2006.01) | |
| *B60R 1/00* | (2022.01) | |
| *G06V 20/59* | (2022.01) | |
| *G06V 40/16* | (2022.01) | |
| *H04L 51/224* | (2022.01) | |

(52) U.S. Cl.
CPC ........ *B60R 25/102* (2013.01); *B60R 25/1003* (2013.01); *B60R 25/1004* (2013.01); *B60R 25/1009* (2013.01); *B60R 25/1018* (2013.01); *B60R 25/1025* (2013.01); *B60R 25/24* (2013.01); *B60R 25/245* (2013.01); *B60R 25/25* (2013.01); *B60R 25/305* (2013.01); *B60R 25/307* (2013.01); *B60R 25/32* (2013.01); *B60R 25/33* (2013.01); *B60R 25/34* (2013.01); *B60R 25/403* (2013.01); *B60R 25/406* (2013.01); *G01B 17/00* (2013.01); *G01J 5/0025* (2013.01); *G01P 13/00* (2013.01); *G01V 11/002* (2013.01); *G06F 3/017* (2013.01); *G06F 3/167* (2013.01); *G06F 8/65* (2013.01); *G06F 21/572* (2013.01); *G06Q 20/102* (2013.01); *G06Q 20/3278* (2013.01); *G06Q 20/40145* (2013.01); *G06Q 30/0635* (2013.01); *G06T 7/174* (2017.01); *G06V 20/59* (2022.01); *G06V 40/172* (2022.01); *G07C 9/00182* (2013.01); *G08B 21/182* (2013.01); *H04L 9/0643* (2013.01); *H04L 9/0869* (2013.01); *H04L 9/3231* (2013.01); *H04L 51/224* (2022.05); *H04W 4/021* (2013.01); *B60R 2011/0007* (2013.01); *B60R 2025/0405* (2013.01); *B60R 2025/1013* (2013.01); *B60R 2300/103* (2013.01); *B60R 2300/8006* (2013.01); *B60R 2300/8073* (2013.01); *B60R 2325/10* (2013.01); *B60R 2325/101* (2013.01); *B60R 2325/103* (2013.01); *B60R 2325/20* (2013.01); *B60R 2325/205* (2013.01); *G06T 2207/10016* (2013.01); *G07C 2009/0019* (2013.01); *G07C 2009/00396* (2013.01); *G07C 2009/00539* (2013.01); *G07C 2009/00769* (2013.01); *G07C 2009/00984* (2013.01); *H04L 2209/84* (2013.01)

(58) Field of Classification Search
CPC .................. B60R 25/305; B60R 25/34; B60R 2300/8006; G01J 5/0025; G01P 13/00; G06T 7/174; G06V 20/59; G08B 21/182
USPC ........................................................ 701/33.2
See application file for complete search history.

(56) References Cited

U.S. PATENT DOCUMENTS

| | | | | |
|---|---|---|---|---|
| 5,683,133 | A * | 11/1997 | Frusti | B60R 25/014 |
| | | | | 180/287 |
| 6,246,313 | B1 * | 6/2001 | Baker | B60T 7/22 |
| | | | | 340/425.5 |
| 6,253,980 | B1 * | 7/2001 | Murakami | G08G 1/20 |
| | | | | 224/924 |
| 6,263,272 | B1 * | 7/2001 | Liu | B60H 1/245 |
| | | | | 236/44 C |
| 6,768,420 | B2 * | 7/2004 | McCarthy | H03K 17/955 |
| | | | | 340/425.5 |
| 6,850,153 | B1 * | 2/2005 | Murakami | B60R 25/2018 |
| | | | | 340/5.2 |
| 6,922,622 | B2 * | 7/2005 | Dulin | B60W 30/18054 |
| | | | | 701/45 |
| 6,930,614 | B2 * | 8/2005 | Rackham | B60R 25/1004 |
| | | | | 340/425.5 |
| 7,170,401 | B1 * | 1/2007 | Cole | B60R 25/10 |
| | | | | 340/439 |
| 7,348,880 | B2 * | 3/2008 | Huies | B60R 25/1004 |
| | | | | 340/425.5 |
| 7,701,358 | B1 * | 4/2010 | White | B60R 16/0232 |
| | | | | 340/425.5 |
| 8,054,203 | B2 * | 11/2011 | Breed | B60N 2/015 |
| | | | | 340/552 |
| 8,058,983 | B1 * | 11/2011 | Davisson | G08B 21/24 |
| | | | | 340/457 |
| 8,190,331 | B2 * | 5/2012 | Browne | B60R 25/102 |
| | | | | 340/425.5 |
| 8,768,292 | B2 * | 7/2014 | Welch | G08B 25/016 |
| | | | | 455/521 |
| 9,227,484 | B1 * | 1/2016 | Justice | B60H 1/00778 |
| 9,266,535 | B2 * | 2/2016 | Schoenberg | B60N 2/28 |
| 9,378,641 | B2 * | 6/2016 | Beumler | B60N 2/002 |
| 9,381,855 | B1 * | 7/2016 | Arnold | G08B 21/22 |
| 9,443,411 | B2 * | 9/2016 | Schoenberg | B60N 2/28 |
| 9,796,371 | B2 * | 10/2017 | Soifer | B60W 10/30 |
| 9,845,050 | B1 * | 12/2017 | Garza | H04W 4/38 |
| 9,847,004 | B1 * | 12/2017 | Lan | G08B 21/24 |
| 10,185,327 | B1 * | 1/2019 | Konrardy | G08G 1/0965 |
| 10,276,016 | B2 * | 4/2019 | Mattarocci | G08B 21/00 |
| 10,308,246 | B1 * | 6/2019 | Konrardy | G05D 1/0287 |
| 10,351,102 | B2 * | 7/2019 | Park | B60Q 5/005 |
| 10,556,581 | B2 * | 2/2020 | Soifer | B60H 1/00978 |
| 10,603,980 | B2 * | 3/2020 | Yu | B60H 1/00985 |
| 10,766,381 | B2 * | 9/2020 | Bradley | B60N 2/002 |
| 10,899,359 | B2 * | 1/2021 | Kim | B60N 2/28 |
| 11,059,348 | B2 * | 7/2021 | Yu | B60H 1/008 |
| 11,345,415 | B2 * | 5/2022 | Funyak | G01S 13/878 |
| 2002/0080014 | A1 * | 6/2002 | McCarthy | H03K 17/955 |
| | | | | 340/561 |

(56) References Cited

U.S. PATENT DOCUMENTS

| | | | | |
|---|---|---|---|---|
| 2002/0161501 A1* | 10/2002 | Dulin | ............... | B60H 1/00742 701/45 |
| 2003/0122662 A1* | 7/2003 | Quinonez | ............... | B60N 2/002 340/457 |
| 2003/0222775 A1* | 12/2003 | Rackham | ............ | G08B 21/0202 340/457 |
| 2007/0013531 A1* | 1/2007 | Huies | ............... | B60R 25/1004 340/584 |
| 2007/0038344 A1* | 2/2007 | Oota | ............... | G07C 9/00309 701/49 |
| 2007/0216517 A1* | 9/2007 | Kurpinski | ............ | B60R 25/245 340/8.1 |
| 2008/0157940 A1* | 7/2008 | Breed | ............... | G06F 3/0238 340/425.5 |
| 2009/0040036 A1* | 2/2009 | Talis | ............... | B60Q 5/00 340/457.1 |
| 2009/0171688 A1* | 7/2009 | Ikeda | ............... | G06Q 30/0281 701/31.4 |
| 2011/0068895 A1* | 3/2011 | Gee | ............... | E05B 77/48 340/5.67 |
| 2011/0080288 A1* | 4/2011 | Younse | ............... | B60N 2/28 340/573.1 |
| 2011/0267186 A1* | 11/2011 | Rao | ............... | B60H 1/00978 348/E5.09 |
| 2012/0232742 A1* | 9/2012 | Elliott | ............... | H04L 67/12 701/1 |
| 2014/0253313 A1* | 9/2014 | Schoenberg | ............ | G08B 21/24 340/457 |
| 2014/0306838 A1* | 10/2014 | Beumler | ............... | B60N 2/002 340/988 |
| 2014/0361889 A1* | 12/2014 | Wall, II | ............... | G08B 21/025 340/539.11 |
| 2016/0042616 A1* | 2/2016 | Dorsey | ............... | G08B 21/22 340/457 |
| 2016/0272112 A1* | 9/2016 | DeGrazia | ............... | B60Q 9/00 |
| 2017/0158186 A1* | 6/2017 | Soifer | ............... | B60H 1/00742 |
| 2018/0065504 A1* | 3/2018 | Lan | ............... | G08B 21/0263 |
| 2018/0072299 A1* | 3/2018 | Soifer | ............... | B60W 10/30 |
| 2018/0111506 A1* | 4/2018 | Penna | ............... | G08B 21/028 |
| 2018/0130327 A1* | 5/2018 | Rogers | ............... | B60N 2/002 |
| 2019/0092127 A1* | 3/2019 | Nguyen | ............... | B60H 1/00978 |
| 2019/0193590 A1* | 6/2019 | Labombarda | ............ | G01K 1/14 |
| 2019/0359172 A1* | 11/2019 | Galicia Rodríguez | ............... | G08B 13/00 |
| 2020/0071967 A1* | 3/2020 | Adams | ............... | G08B 21/24 |
| 2020/0282803 A1* | 9/2020 | Upmanue | ............... | B60N 2/879 |
| 2020/0290567 A1* | 9/2020 | Funyak | ............... | B60R 25/34 |
| 2021/0023964 A1* | 1/2021 | Labombarda | ............ | G01P 15/18 |

\* cited by examiner

VEHICULAR SAFETY MONITORING

CROSS REFERENCE TO RELATED APPLICATIONS

This application claims the benefit of and priority to U.S. Provisional Patent Application No. 63/141,248, filed Jan. 25, 2021, entitled "VEHICULAR SAFETY MONITORING," and is a continuation-in-part of U.S. Non-Provisional patent application Ser. No. 17/157,369. Filed Jan. 25, 2021, entitled "PHYSICALLY SECURED DEVICE FOR VEHICLE INTRUSTION DETECTION," which is a continuation of U.S. Non-Provisional patent application Ser. No. 16/988,447, filed Aug. 7, 2020, entitled "PHYSICALLY SECURED DEVICE FOR VEHICLE INTRUSION DETECTION," which claims the benefit of and priority to U.S. Provisional Patent Application No. 62/883,875, filed Aug. 7, 2019 and entitled "SYSTEMS, METHODS, AND APPARATUSES FOR AUTOMOBILE ACCESS AND INTRUSION DETECTION," all of which are incorporated herein by reference in their entireties.

TECHNICAL FIELD

The present systems and processes relate generally to detecting and responding to activity in and around a vehicle.

BACKGROUND

Previous approaches to monitoring vehicle safety typically rely on detecting potential safety issues such as impacts, rapid acceleration, and aggressive braking. However, such approaches may fail to account for other common safety issues including infant abandonment, passenger endangerment, and hazardous driving. For example, previous vehicle safety systems are typically agnostic as to the presence of an infant within a vehicle and, therefore, are unable to alert a driver that they have left the infant in the vehicle (e.g., where temperature and air conditions may quickly approach hazardous levels). As another example, previous vehicle safety systems may be unable to detect that a teenage driver operates a vehicle in violation of a curfew, with an illegal number of passengers, and in the presence of marijuana vapors. In another example, previous solutions may allow for a senior citizen or other at-risk person to operate a vehicle without alerting a care provider. In the same example, safety solutions may be incapable of addressing vehicle safety issues commonly experienced by the elderly, such as, for example, loss of direction or driving outside of daylight hours.

Therefore, there is a long-felt but unresolved need for a system or process that detects and responds to potentially hazardous vehicle-related events and activities.

BRIEF SUMMARY OF THE DISCLOSURE

Briefly described, and according to one embodiment, aspects of the present disclosure generally relate to systems and processes for monitoring a vehicle and subjects therein.

In various embodiments, the present disclosure provides systems and processes for detecting and responding to various vehicle-related events. Non-limiting examples of vehicle-related events include the presence and absence of one or more subjects in a vehicle, endangerment or distress of the subjects, and various statuses of the vehicle. In one example, the present system monitors for abandonment of an infant in the vehicle and/or occurrence of potentially hazardous conditions therein (e.g., excess heat, carbon monoxide, etc.). In another example, the system monitors behavior and vehicle operation of teenage occupants, such as, for example, reckless driving, curfew violation, and controlled substance consumption. In another example, the system monitors driving performance and safety of a senior driver. The system can perform various response actions based on detecting one or more events. Non-limiting examples of actions include, but are not limited to, transmitting an alert (e.g., to a mobile device, emergency contacts, law enforcement, etc.), generating various effects within and around the vehicle (e.g., lights and sounds for attracting attention of passersby), controlling one or more vehicle elements (e.g., preventing engine ignition, controlling locks, (de)activating an air conditioner, (de)activating a heater, (de)activating an entertainment system, etc.), generating reports of driver and vehicle performance, and generating user interfaces for controlling system functions and for monitoring the vehicle and/or subjects therein.

According to a first aspect, a system, comprising: A) a data store comprising event configuration data; B) at least one sensor configured to sense at least one type of measurement corresponding to a vehicle; and C) at least one computing device coupled to the at least one sensor, the at least one computing device configured to: 1) read a plurality of measurements from the at least one sensor; 2) determine that a particular event has occurred by analyzing the plurality of measurements based on the event configuration data; and 3) in response to determining that the particular event has occurred, perform at least one remedial action.

According to a further aspect, the system of the first aspect or any other aspect, wherein the at least one computing device is further configured to: A) generate at least one driving score corresponding to the vehicle based on the plurality of measurements; B) determine a location associated with the vehicle; and C) generate at least one road condition score corresponding to the location, wherein determining that the particular event has occurred comprises analyzing the at least one driving score and the at least one road condition score.

According to a further aspect, the system of the first aspect or any other aspect, wherein the at least one computing device is further configured to: A) determine a geographical identifier for a location associated with the vehicle; and B) download a weather report corresponding to the geographical identifier, wherein determining the particular event has occurred by analyzing the plurality of measurements is further based on the weather report.

According to a further aspect, the system of the first aspect or any other aspect, wherein the at least one computing device is further configured to analyze the plurality of measurements by comparing the plurality of measurements to at least one predefined threshold.

According to a further aspect, the system of the first aspect or any other aspect, wherein the at least one computing device is further configured to: A) compute at least one metric on the plurality of measurements over a predefined time window; and B) analyze the plurality of measurements by comparing the at least one metric to at least one predefined threshold.

According to a further aspect, the system of the first aspect or any other aspect, wherein the event configuration data comprises a plurality of events, at least one respective threshold associated with individual ones of the plurality of events, and at least one respective remedial action associated with the individual ones of the plurality of events, and the at least one computing device is further configured to determine the particular event from the plurality of events by determining that each of the at least one respective threshold associated with the particular event is met, wherein the at least one remedial action comprises the at least one respective remedial action associated with the particular event.

According to a further aspect, the system of the first aspect or any other aspect, wherein the at least one remedial action comprises restricting a speed of the vehicle.

According to a second aspect, a method, comprising: A) sensing, via at least one sensor, at least one type of measurement corresponding to a vehicle; B) reading, via at least one computing device, a plurality of measurements from the at least one sensor; C) determining, via the at least one computing device, that a particular event has occurred by analyzing the plurality of measurements based on event configuration data; and D) in response to determining that the particular event has occurred, performing, via the at least one computing device, at least one remedial action.

According to a further aspect, the method of the second aspect or any other aspect, further comprising: A) determining, via the at least one computing device, a count of individuals in the vehicle based on the plurality of measurements; and B) determining, via the at least one computing device, that the particular event has occurred by analyzing the plurality of measurements based further on the count of individuals in the vehicle.

According to a further aspect, the method of the second aspect or any other aspect, wherein reading the plurality of measurements comprises: A) determining, via the at least one computing device, a speed and a direction of the vehicle; and B) applying, via the at least one computing device, a plurality of rules to the plurality of measurements to determining that the particular event has occurred, wherein the event configuration data comprises the plurality of rules.

According to a further aspect, the method of the second aspect or any other aspect, wherein the at least one remedial action comprises generating an alert on a mobile device associated with an administrative user.

According to a further aspect, the method of the second aspect or any other aspect, further comprising determining, via the at least one computing device, that the vehicle has lost traction on a road based on the plurality of measurements, wherein the particular event is determined based further on the vehicle losing traction.

According to a further aspect, the method of the second aspect or any other aspect, further comprising: A) determining, via the at least one computing device, a current position of the vehicle on a particular road; B) determining, via the at least one computing device, a current speed limit for the current position on the particular road; C) comparing, via the at least one computing device, a current vehicle speed of the vehicle to the current speed limit to determine a speed delta of the vehicle relative to the current speed limit; and D) determining, via the at least one computing device, that the particular event has occurred further by determining that the speed delta meets a predefined speed delta threshold based on the event configuration data.

According to a further aspect, the method of the second aspect or any other aspect, further comprising: A) determining, via the at least one computing device, at least one adverse driving condition based on the plurality of measurements; and B) modifying, via the at least one computing device, the predefined speed delta threshold based on the at least one adverse driving condition.

According to a third aspect, a non-transitory computer-readable medium embodying a program that, when executed by at least one computing device, causes the at least one computing device to: A) read a plurality of measurements from at least one sensor configured to sense at least one type of measurement corresponding to a vehicle; B) determine that a particular event has occurred by analyzing the plurality of measurements based on event configuration data stored in a memory associated with the at least one computing device; and C) perform at least one remedial action based on the particular event occurring.

According to a further aspect, the non-transitory computer-readable medium of the third aspect or any other aspect, wherein the at least one remedial action comprises disabling the vehicle.

According to a further aspect, the non-transitory computer-readable medium of the third aspect or any other aspect, wherein the program further causes the at least one computing device to: A) determine a current driver of the vehicle; and B) load the event configuration data associated with the current driver from a plurality of event configuration data.

According to a further aspect, the non-transitory computer-readable medium of the third aspect or any other aspect, wherein the program further causes the at least one computing device to determine the current driver of the vehicle based on reading an identifier from an electronic device in the vehicle.

According to a further aspect, the non-transitory computer-readable medium of the third aspect or any other aspect, wherein the electronic device comprises at least one of: a key FOB, a smart phone, a tablet, or a laptop.

According to a further aspect, the non-transitory computer-readable medium of the third aspect or any other aspect, wherein the particular event comprises a vehicular accident and the at least one remedial action comprises generating a notification to emergency response services.

According to a fourth aspect, a method, comprising: A) capturing, via at least one image sensor, a plurality of video frames corresponding to a vehicle; B) reading, via at least one computing device, a plurality of measurements from at least one sensor; C) determining, via the at least one computing device, that a particular event has occurred in the vehicle by analyzing the plurality of measurements and the plurality of video frames based on event configuration data; and D) in response to determining that the particular event has occurred, performing, via the at least one computing device, at least one remedial action.

According to a further aspect, the method of the fourth aspect or any other aspect, wherein the at least one sensor comprises an infrared camera and the method further comprises: A) reading, via the at least one computing device, a plurality of infrared frames from the infrared camera; B) identifying, via the at least one computing device, an area with a thermal variance in at least one of the plurality of infrared frames; and C) monitor a temperature of the area with the thermal variance, wherein determining that the particular event has occurred further comprises determining that the temperature of the area exceeds a temperature threshold.

According to a further aspect, the method of the fourth aspect or any other aspect, further comprising: A) monitoring, via the at least one computing device, to determine whether the particular event has ended; and B) performing, via the at least one computing device, a plurality of additional remedial actions over time until the particular event ends.

According to a further aspect, the method of the fourth aspect or any other aspect, further comprising determining a temperature in the vehicle exceeds a predetermined temperature threshold based on the plurality of measurements, wherein the at least one remedial action is further performed in response to the temperature exceeding the predetermined temperature threshold.

According to a further aspect, the method of the fourth aspect or any other aspect, further comprising: A) monitoring a length of time since the particular event started; and B) determining that the length of time exceeds a time threshold, wherein the at least one remedial action is further performed in response to the length of time exceeding the time threshold.

According to a further aspect, the method of the fourth aspect or any other aspect, wherein the particular event comprises one of: a child being left in the vehicle or a pet being left in the vehicle.

According to a further aspect, the method of the fourth aspect or any other aspect, wherein the at least one remedial action comprises generating an alert on a mobile device associated with an administrative user.

According to a fifth aspect, a system, comprising: A) a data store comprising event configuration data; B) at least one sensor configured to sense at least one type of measurement corresponding to a vehicle; and C) at least one computing device coupled to the at least one sensor, the at least one computing device configured to: 1) read a plurality of measurements from the at least one sensor; 2) determine that a particular event has occurred by analyzing the plurality of measurements based on the event configuration data; and 3) in response to determining that the particular event has occurred, perform at least one remedial action.

According to a further aspect, the system of the fifth aspect or any other aspect, further comprising a body of a sensing device, wherein the at least one sensor and the at least one computing device are disposed within the body and the body is configured to be affixed to an interior of the vehicle.

According to a further aspect, the system of the fifth aspect or any other aspect, wherein the at least one sensor comprises a camera, the particular event comprises leaving an infant in the vehicle, and the at least one computing device is configured to analyzing the plurality of measurements by performing image analysis on a plurality of frames from the camera to identify the infant in the vehicle.

According to a further aspect, the system of the fifth aspect or any other aspect, wherein the at least one sensor comprises a camera, the particular event comprises leaving a pet in the vehicle, and the at least one computing device is further configured to determine that a particular event has occurred by analyzing the plurality of measurements by: A) performing image analysis on a plurality of frames from the camera to identify the pet in the vehicle; B) monitoring the pet in the vehicle in the plurality of frames over a period of time; C) determining that the period of time exceeds a time threshold; and D) determining that the particular event has occurred responsive to the period of time exceeding the time threshold.

According to a further aspect, the system of the fifth aspect or any other aspect, wherein the at least one computing device is further configured to enter into an arm mode in response to the pet being identified in the vehicle.

According to a further aspect, the system of the fifth aspect or any other aspect, wherein the at least one computing device is configured to performing the at least one remedial action by: A) initiating a video call to a mobile device associated with a particular user account; B) streaming an audio and video feed of an interior of the vehicle to the mobile device; and C) outputting, via a speaker in the interior of the vehicle, an audio signal from the mobile device.

According to a further aspect, the system of the fifth aspect or any other aspect, wherein the at least one sensor comprises a microphone, the particular event comprises leaving an infant in the vehicle, and the at least one computing device is configured to analyzing the plurality of measurements by performing audio analysis on an audio stream from the microphone to identify the infant in the vehicle.

According to a sixth aspect, a non-transitory computer-readable medium embodying a program that, when executed by at least one computing device, causes the at least one computing device to: A) read a plurality of measurements from at least one sensor configured to sense at least one type of measurement corresponding to a vehicle; B) determine that a particular event has occurred by analyzing the plurality of measurements based on event configuration data stored in a memory associated with the at least one computing device; and C) perform at least one remedial action based on the particular event occurring.

According to a further aspect, the non-transitory computer-readable medium of the sixth aspect or any other aspect, wherein the at least one sensor comprises a camera and the program further causes the at least one computing device to: A) read the plurality of measurements from the at least one sensor comprises receiving a plurality of video frames from the camera; and B) track a movement pattern of a pet within a subset of the plurality of video frames.

According to a further aspect, the non-transitory computer-readable medium of the sixth aspect or any other aspect, wherein the program further causes the at least one computing device to: A) analyze a plurality of frames from a camera device, wherein the at least one sensor comprises the camera device; B) identify an animal in at least one frame of the plurality of frames; and C) determine a current temperature in the vehicle meets or exceeds a predefined threshold stored in the event configuration data, wherein determining that the particular event has occurred is responsive to the animal being identified and the current temperature in the vehicle meeting or exceeding the predefined threshold.

According to a further aspect, the non-transitory computer-readable medium of the sixth aspect or any other aspect, wherein the at least one remedial action comprises starting the vehicle.

According to a further aspect, the non-transitory computer-readable medium of the sixth aspect or any other aspect, wherein the at least one remedial action comprises at least partially opening at least one window in the vehicle.

According to a further aspect, the non-transitory computer-readable medium of the sixth aspect or any other aspect, wherein the program further causes the at least one computing device to determine a last driver of the vehicle, wherein the at least one remedial action comprises sending an alert to a mobile device associated with the last driver.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
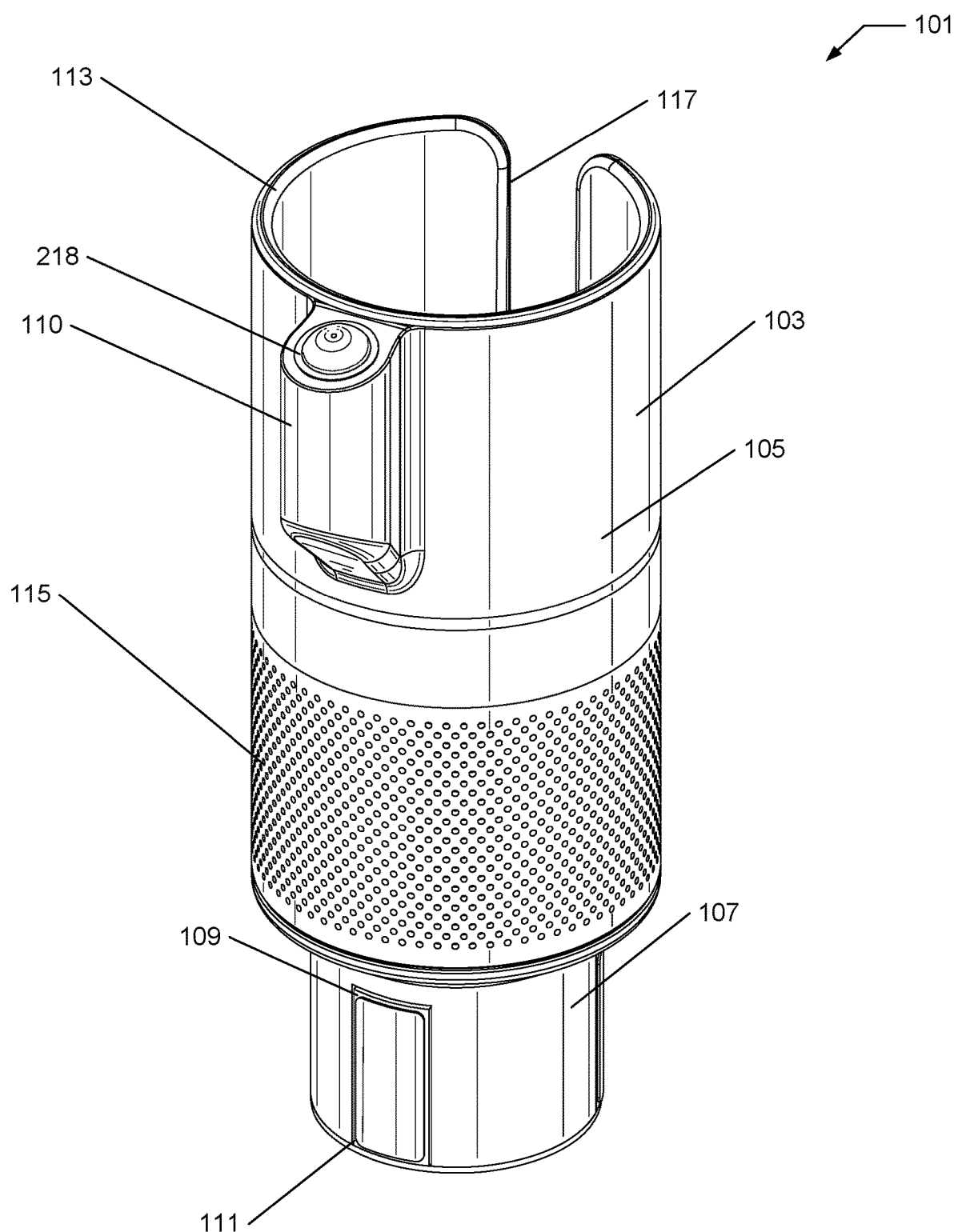
FIG. 1A illustrates an exemplary security device according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Figure 2:
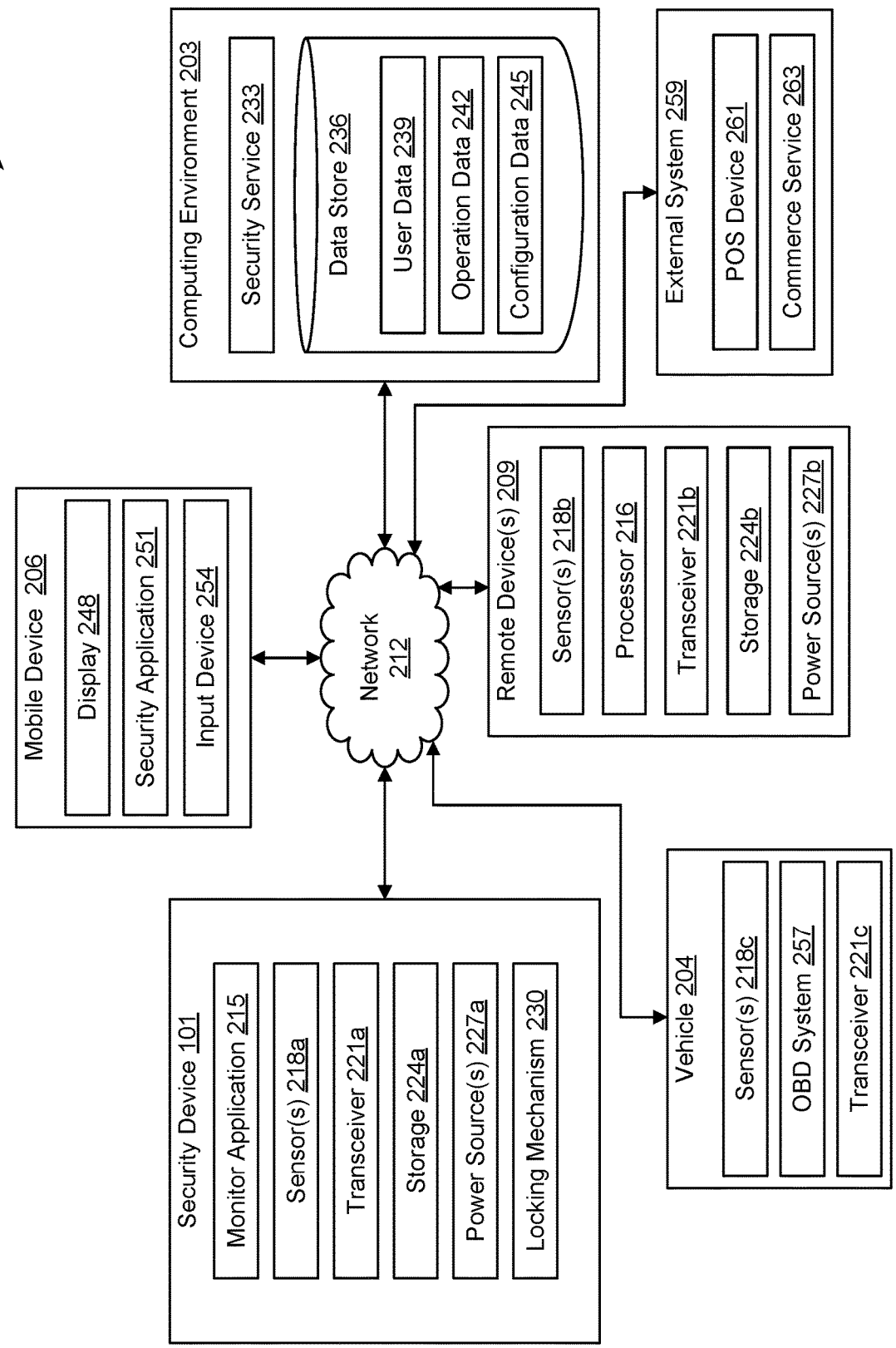
FIG. 2 illustrates an exemplary monitoring system according to one embodiment of the present disclosure.

FIG. 1A is a perspective view of a security device 101 according to one embodiment of the present disclosure. It will be understood that the security devices shown in FIGS. 1A and 1n other drawings are provided for exemplary purposes of illustration and description. The security device 101 can include a body 103 with a generally cylindrical shape. The shape of the body can correspond to a shape of a target site within a vehicle 204 (FIG. 2). For example, the body 103 can be shaped to conform to a cup-holder, side door receptacle, or other structure within the vehicle 204. In some embodiments, multiple devices 101 of varying shapes are included. For example, a vehicle (not shown) can include a first security device of a generally cylindrical shape for conforming to a cup-holder and a second security device of a generally rectangular and low profile shape for conforming to a side door receptacle or to mount to the front of back of a seat. The body 103 can include one or more materials including, but not limited to, high-strength plastics, polymers, resins, metals, such as stainless steel, and other resilient or semi-resilient materials.

The body 103 can include a first portion 105 and a second portion 107. The first portion 105 can rotate about the second portion 107. The first portion 105 can freely rotate about the second portion 107. Alternatively, the first portion 107 can rotate freely only between a first and a second position that correspond to particular functions of the security device 101. In one example, the rotation of the first portion 105 about the second portion 107 can engage a locking mechanism (not shown in FIG. 1A).

The second portion 107 can include one or more legs 109 that are configured to extend or protrude outward from the body 103 in response to the engaging of the locking mechanism. In one example, rotation of the first portion 105 about the second portion 107 causes the plurality of legs 109 to extend outward and contact and apply pressure to the walls of a target site, such as a cup holder. As shown in FIG. 1A, the leg 109 is in an unextended position. The leg 109 can include one or more materials, such as stainless steel or high-strength plastics. A distal end 111 of the leg 109 can include one or more friction materials configured to contact and generate frictional forces with the walls of a target site. The friction materials can demonstrate a greater coefficient of friction than other materials from which the leg 109 is formed. Such frictional materials may include rubber, foam, or other materials with high coefficients of friction.

One or more sensors 218 can be disposed on or within the first portion 105 and/or the second portion 107. In one example, the first portion 105 includes a first sensor 218 attached to a sensor mount 110, and a plurality of secondary sensors 218 configured externally on the body 103. In another example, the first portion 105 includes a first sensor for detecting motion of a person and the second portion 107 includes a second sensor for detecting tilt of the vehicle 204. In another example, the first portion 105 includes a first sensor for detecting pressure and the second portion 107 includes a second sensor for detecting sound. The body 103 can include one or more sensor mounts 110 to which one or more sensors 218 are mounted. The sensor 218 can detect activity occurring within the security device 101 and/or within and around a vehicle within which the security device 101 is installed.

The first portion 105 can include a cup holder 113 for receiving a beverage or other item. In some embodiments, the first portion 105 includes a slot that can receive a mobile device, such as a smartphone. The first portion 105 can include a magnetic or rubberized phone mount for securely holding a smartphone. The security device 101 can include a device for generating alarms of varying frequency, volume, composition, and duration. The body 103 can include perforations 115 or other voids for improved transmission of alarms and other sounds originating within the body 103. The first portion 105 can include one or more grooves 117 formed into the body 103 that provide means for easier extraction of items, such as a smartphone or beverage, placed within the cup holder 113.

According to one embodiment, the security device 101 includes one or more speakers (not shown) for transmitting audible alarms and other notifications. The cup holder 113 and/or other portions of the body 103 can be configured to amplify sounds from the speaker. For example, the second portion 107 can be shaped to cause a reverberation of sounds within the cup holder 113. In an exemplary scenario, sound from the speaker is projected downward into the cup holder 113 and is reverberated by the second portion 107 such that a clarity and/or volume of the sound is enhanced. In a similar example, the second portion 107 is shaped to reverberate sound through one or more perforations 115 throughout the body 103.

Figure 1B:
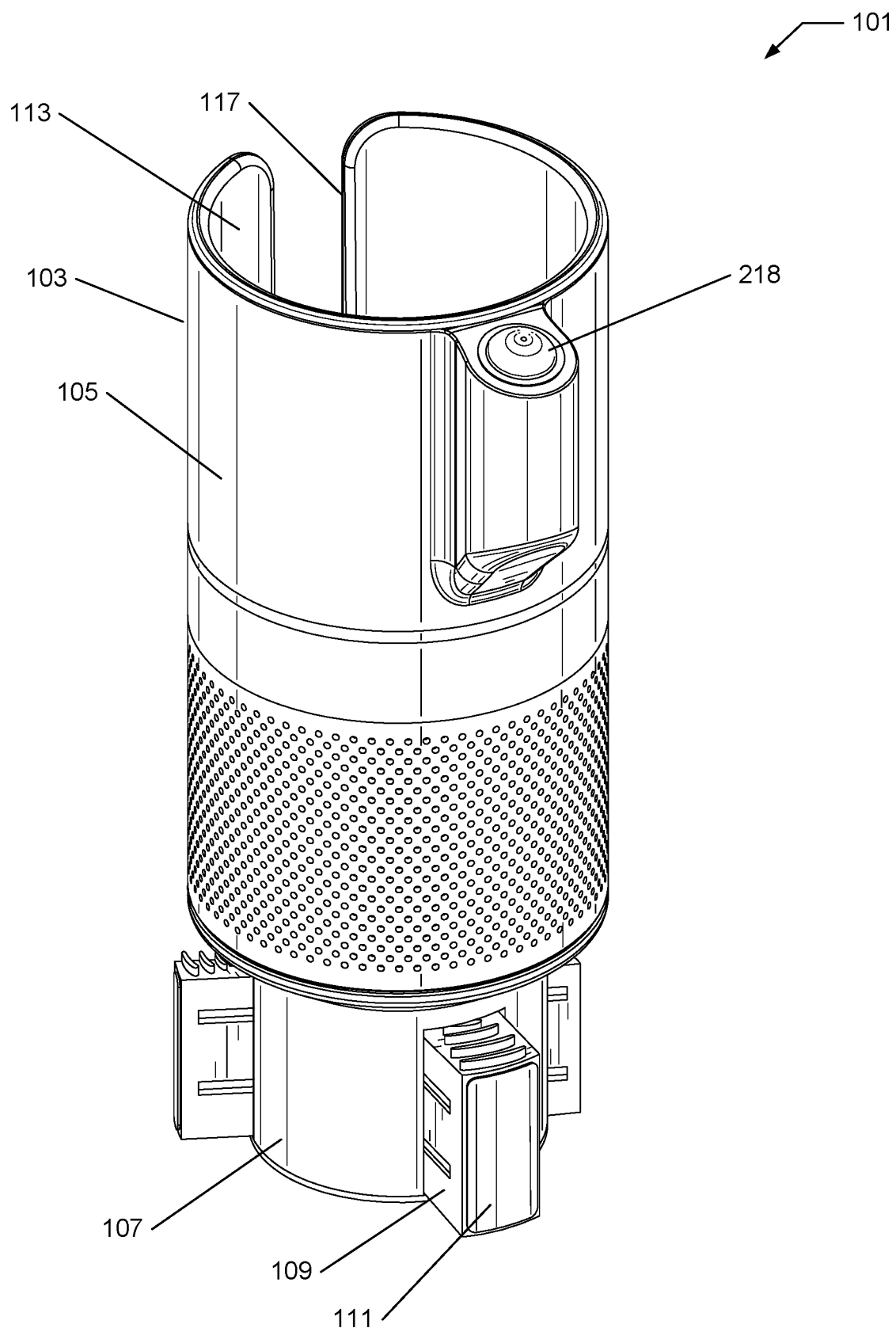
FIG. 1B illustrates an exemplary security device according to one embodiment of the present disclosure.

FIG. 1B is a perspective view of the security device 101 according to one embodiment of the present disclosure. In the embodiment shown in FIG. 1B, the first portion 105 has been rotated from a first position (e.g., as shown in FIG. 1A) to a second position and, in response to the rotation, a plurality of legs 109 extend outward from the second portion 107. In one example, the first portion 105 is rotated about 45 degrees counterclockwise, thereby engaging a locking mechanism (not shown) that extends the plurality of legs 109 outward.

FIG. 2 illustrates an exemplary networked environment 200. As will be understood and appreciated, the networked environment 200 shown in FIG. 2 represents merely one approach or embodiment of the present system, and other aspects are used according to various embodiments of the present system.

The networked environment 200 can include one or more security devices 101, a computing environment 203, one or more mobile devices 206, a vehicle 204, and one or more remote devices 209 in communication via a network 212. In some embodiments, the security device 101 may communicate with the vehicle 204 over a first network (e.g., via an OBD port), the remote device 209 via a second network 212, and communicate to the computing environment 203 and the mobile device 206 via third network 212. In at least one embodiment, the security device 101 may not communicate with the vehicle 204 and/or any remote devices 209.

The security device 101 can include a monitor application 215, one or more sensors 218a, one or more transceivers 221a, one or more storage devices 224a, one or more power sources 227a, and one or more locking mechanism 230. The security device 101 can include a circuit board with an embedded computing device or system-on-a-chip (SOC) architecture. The security device 101 can include a computing device with a processor and memory to execute the monitoring application 215. The monitoring application 215 can read measurements from each of the sensors 218a. Based on the measurements, the monitor application 215 can determine whether a particular event or activity has taken place. Non-limiting examples of activities and events include, but are not limited to, unlawful or unpermitted vehicle operation, vehicle collision, infant placement and/or abandonment, operation of the vehicle 204 by a particular subject (e.g., a teenager, senior citizen, etc.), and presence of controlled substances within the vehicle 204.

The monitor application 215 can be executed by a processor of the security device 101 to receive measurements from the sensors 218a, which can be stored in the storage device 224a. The monitor application 215 can send the measurements from the storage device 224a to the security service 233 via the network 212 using the transceiver 221a. The network 212 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

The sensors 218 can sense various aspects of inside or outside of the vehicle 204 and potentially areas proximate the vehicle 204. In some embodiments, the sensor 218 senses various aspects of the security device 101. The sensor 218 can include, but is not limited to, passive infrared (PIR) sensors, microwave sensors, ultrasound sensors, auditory sensors including microphones and glass break sensors, pressure sensors, temperature sensors (e.g., for measuring internal and external vehicle temperature, subject temperature, etc.), air quality sensors, ambient light sensors, video and still image cameras, proximity sensors, global positioning system (GPS) sensors, speed sensors, accelerometers, compass, barometer, motion sensors including gyroscopic sensors, pressure sensors, weight sensors, radio frequency sensors including Bluetooth, WiFi, NFC and other RF sensors, tilt sensors, radar sensors, light detecting and ranging (LiDAR) sensors, chemical sensors, capacitive touch sensors, flame sensors, and road condition sensors (e.g., for measuring grip, road surface temperature, dew point, humidity, rain, snow, ice, frost, etc.).

The monitor application 215 can utilize various sensors to detect events and generate an alert to an administrative user or local authorities, such as a medical response unit, a police service, or a fire service. In one example, the monitor application 215 can read from a chemical sensor to detect carbon monoxide, tobacco, alcohol, marijuana, and/or other chemical signatures. In another example, a camera sensor captures an image of a vehicle interior and performs facial recognition or another calibration process to detect the presence of a subject (e.g., an infant, teenager, etc.) within the vehicle. The monitor application 215 can analyze a stream from the camera sensor to detect smoke or specific actions in the vehicle. In another example, the monitor application 215 can read a radio frequency sensor to detects a mobile device 206 within a predetermined proximity of the vehicle 204 or security device 101. In another example, the monitor application 215 can read from an audio sensor to detect a key word or phrase (e.g., a curse word or blacklisted phrase, a predetermined emergency phrase, etc.). The words or phrases may be from a predetermined list of words or phrases. In one example, the list of words or phrases is a blacklist of words or phrases determined as inappropriate for a particular driver (e.g., a teen). In another example, the list of words or phrases includes commands, such as "help", that can alert local authorities, for example, if an elderly driver is having a medical emergency.

In another example, the monitor application 215 can read from a light sensor to determine that a vehicle 204 is being operated after sundown. The monitor application 215 can receive an indication from the vehicle 204 that an ignition event has occurred outside of a preconfigured operating schedule. In response to an ignition event, the monitor application 215 may attempt to determine a current driver, such as, for example, by searching for a Bluetooth wireless device associated with a particular individual, by scanning for an identifier in a key fob associated with a particular individual, by analyzing a video feed, by monitoring a driving style and comparing the driving style to profiles associated with one or more individuals, or through some other manner. In another example, the monitor application 215 can read from a road condition sensor and/or a weather service to detect moisture and/or temperature levels associated with potentially icy road conditions. In another example, the monitor application 215 can read from an accelerometer to detect and record speed, acceleration, sideways motion, and breaking patterns of the vehicle 204 (e.g., to assess driving performance, determine a likelihood of racing or driving aggressively, determine a likelihood of driving under a speed limit, or determine a likelihood that an accident occurred or is about to occur). The monitor application 215 can utilize a GPS location and direction of travel to identify a current street and identify the speed limit for that street from a database or remote service. The monitor application 215 can monitor for unsafe lane changes, for example, by identifying when a turn signal is enabled when a vehicle is in an adjacent lane or identifying an incomplete lane change.

The sensor 218 can include one or more emitting components, such as radar-emitting, laser light-emitting, visible light-emitting, infrared light-emitting, ultraviolet light-emitting, sound wave-emitting, or microwave-emitting elements for use with various sensors 218. In one example, the sensors 218 include one more video recording devices that each comprise an upwardly, outward, downward (or other direction) facing wide-angle camera for detecting a 360 degree view of the interior of the vehicle 204 from one or more perspectives. In certain embodiments, a PIR sensor 218, a speaker, a GPS sensor 218, and other sensors 218 may be positioned in optimal locations within the apparatus for optimizing performance (e.g., the PIR sensor 218 may be positioned on the driver's side of the apparatus to better detect driver behavior or positioned hanging from a backseat headrest to view down on a child seat to better detect presence of an infant).

The one or more sensors 218 may operate simultaneously, and each sensor 218 may communicate the sensor data including readings, measurements, and/or a feed to the monitor application 215. In various embodiments, the sensor data may be communicated along a wired or wireless connection. Each sensor 218 may include its own designated GPIO line of a processor, its own buffer circuit, such as I2C, RS232, RS485, etc., or may share a data bus to communicate with the monitor application. In some embodiments, one or more sensors 218 may communicate wirelessly with the security device 101 and include separate power sources 227a. Examples of sensor data include, but are not limited to, captured image, video, or audio data and values for pressure, temperature (e.g., discrete temperature or a rate of change of temperature), humidity, distance, orientation (e.g., tilt), weight, reflected signal strength, and other measurements.

The monitor application 215 can manage the configurations of each of the sensors 218 individually or in the aggregate. In some embodiments, a reading from a first sensor 218 can cause the monitor application 215 to make a configuration change to a second sensor 218. The monitor application 215 can configure the various sensors according to one or more rules in the configuration data 245. In some embodiments, the configuration settings for each sensor are determined by the security service 233 and sent to the monitor application 215 to apply to the sensors 218. In other embodiments, the monitor application 215 can receive the rules from the security service 233 and apply the rules to configure the security device 101 (e.g., the sensors 218a and other components) and potentially other devices, such as the vehicle 204 and the remote devices 209. In one embodiment, the monitor application may receive feedback of one or more false identifications of an event and adjust a configuration of the security device 101 based on the sensor data that resulted in the false identification. As an example, a weight associated with measurements from a particular motion sensor 218 can be reduced in response to false identifications of events resulting from measurements from the particular motion sensor 218 (e.g., if the particular motion sensor 218 captures movement of trees outside of a window while parked. The configuration adjustments based on false identification can be limited to a particular geofence, such as when parked in a particular driveway. Measurements from a first sensor 218 can be processed and analyzed in a local computing environment and determinations generated therefrom can be used to initiate a configuration change of a second sensor 218 from a low power mode to a high power mode (or vice versa).

In some examples, configuring the sensor corresponds to adjusting the way the monitor application 215 interacts with the sensor. The monitor application 215 may receive a stream of a video from a camera sensor 218 and only store at the predetermined frequency according to the configuration. In one example, the monitor application 215 can configure a camera sensor to continuously operate in a low frequency mode and a sound sensor to continuously operate in a high frequency mode. In this same example, upon the sound sensor detecting a sound of a frequency and decibel level that satisfies a predetermined threshold (e.g., such as a window breaking or door handle being operated), the camera sensor is re-configured to a high-frequency mode and captures a continuous video of the vehicle interior for a predetermined time period.

The sensor 218 can be configured to continuously record a predetermined period of activity at a predetermined refresh rate. In one example, a camera sensor continuously captures a threshold duration of video data in a buffer in real time, the buffer being overwritten by each subsequent capture. In the same example, in response to determining that an event has occurred, the most-recent buffer of video data can be retrieved to provide analyzable data for activity occurring in or around the vehicle 204 during the time period immediately preceding the event.

In some embodiments, one or more sensors 218 may correspond to one or more electrical components in communication with the monitor application 215 via one or more general purpose input and output pins. The monitor application 215 may generate a signal, such as an RS232 signal, an RS485 signal, an I2C signal, or another signal, to communicate with, read from, or configure the sensor 218. The sensor 218 may include an onboard memory with configuration options to store the configuration from the monitor application 215. In other embodiments, the sensor 218 may be configured based on an input voltage at one or more pins, and the monitoring application 215 can control the output voltage (e.g., via a digital to analog converter, through pulse width modulation, or similar control) on the one or more pins to configure the sensor 218. In another embodiment, the sensor 218 may be configured based on a resistance between two or more pins, and the monitoring application 215 can adjust a variable resistance to configure the sensor 218.

The monitor application 215 can be configured to perform various processes for supporting functions of the security device 101 including, but not limited to, processing sensor readings, analyzing sensor readings, and, based on the analyses, determining if an event has occurred. In some embodiments, the monitor application 215 can cause the security device 101 to undergo a change in operating mode. For example, the monitor application 215 can determine that readings from a sensor 218 exceed a predetermined threshold and, in response to the determination, the security device 101 can transition from a low power mode associated with passive sensor processing to a high power mode associated with transmitting sensor readings and generating alerts.

The monitor application 215 can enable or disable the transceiver 221a. The transceiver 221 can communicate with the network 212 via an internet connection. The internet connection can correspond to a cellular data connection, a satellite data connection, a WiFi connection, or some other connection. In one embodiment, the security device 101 can connect to a WiFi network provided by the vehicle 204. In another embodiment, the security device 101 can use a first transceiver 221 to access or provide a cellular or satellite data connection, and the security device 101 can use a second transceiver 221 to provide a WiFi hotspot in the vehicle 204. The vehicle 204 or a mobile device 206 may utilize the WiFi hotspot to access the internet via the first transceiver and the second transceiver.

The transceiver 221 can be configured for sending and receiving data via the network 212. The monitor application 215, via the transceiver 221a, can transmit and receive various commands from the computing environment 203 and/or the mobile device 206. In response to commands received at the transceiver 221, various behaviors and parameters of the security device 101 (or components connected thereto) can be changed. For example, the monitor application 215 can receive a command instructing the security device 101 to enter a normal or high power mode. In response to receiving the command, the monitor application 215 can automatically re-configure the security device 101 from a low power mode to the normal or high power mode. As another example, the monitor application 215 can receive a request for sensor readings including a video of the interior of the vehicle 204. In this example, in response to receiving the request, the monitor application 215 can retrieve and transmit buffer data comprising the video to the computing environment 203, to the mobile device 206, or to a particular destination provided in the request.

The storage 224 can provide data storage for interim data being used by the monitor application 215, such as historical sensor measurements including video and audio data among other data. The monitor application 215 may store and maintain one or more sensor data buffers on the storage 224 with a configured amount of sensor history. As an example, the storage 224 may include a video buffer with the most recent thirty seconds of video being stored. When an unauthorized event is detected, the monitor application 215 may capture and store sensor data (e.g., video, audio, or other sensor data) during the unauthorized event. The monitor application 215 may copy or otherwise initialize the sensor data for the unauthorized event with a portion or all of the sensor data buffers. The monitor application 215 may transmit the stored sensor data to the computing environment 203, either in real-time or in segments according to predetermined criteria. In some embodiments, the storage 224 includes information associated with one or more user accounts registered with the security device 101. For example, the storage 224 can include lists of contacts, payment processing information, addresses, and other data.

As an illustrative example, a senior may walk around the vehicle 204 from 1:00:01 PM to 1:00:27 PM, then proceed to enter the vehicle 204 from 1:00:28 PM to 1:00:45 PM. The monitor application 215 may sense the senior entering the vehicle 204, via one or more sensors 218 at 1:00:29 PM. At 1:00:29 PM, the sensor data buffer may include historical data measurements from 12:59:59 PM (e.g., if configured for a 30 second buffer), and the monitor application 215 can capture and store sensor data including the sensor data buffer from 12:59:59 PM (or a subset thereof).

The power source 227 can include a battery, a capacitor, a DC power source, an AC power source, another power source, or a combination thereof. As an example, the security device 101 may have a battery mounted inside of a case to provide power to circuitry and sensors 218 included therein. As another example, the security device 101 may receive power from the vehicle 204, such as from a cigarette lighter, a power outlet, a USB port, an OBD port, a wireless charging connection, or through another connection. In one example, the vehicle 204 may include a wireless power source 227 (e.g., a QI or other inductive charger) in a cup holder or another location, and the security device 101 can receive electrical energy from the wireless charger. The security device 101 may store the electrical energy in an onboard battery or other onboard power source 227.

The security device 101 can be mounted into the vehicle 204 to provide a user of the vehicle 204 with monitoring and notification when a malicious party interacts with the vehicle 204. The security device 101 can be secured into the vehicle 204 via the locking mechanism 230 to prevent the malicious party from being able to remove or disable the security device 101 during an unauthorized interaction with the vehicle 204, e.g., a break-in event. In one embodiment, the security device 101 has a form factor that fits within a cup holder of the vehicle 204. A body of the security device 101 can include a first portion and a second portion that can be rotated relative to one another. The locking mechanism 230 may engage when the first portion rotates relative to the second portion in a first direction and disengage when the first portion rotates relative to the second portion in a second direction. The first direction may be opposite the second direction.

The locking mechanism 230 can include an engaging component that can be enabled or disabled electronically, for example, in response to a command or in response to a particular sensor reading or determination generated therefrom. In some embodiments, the engaging and disengaging of the locking mechanism can be enabled or disabled by the monitor application 215. In one example, the security device 101 may include a solenoid that may extend or retract to enable or disable the locking mechanism 230. As another example, the locking mechanism 230 can include a cam that may rotate to engage or disengage a clutch mechanism. When the engagement component is disabled, rotating the first portion relative to the second portion does not engage or disengage the locking mechanism 230. In contrast, when the engagement component is enabled, rotating the first portion relative to the second portion does engage and/or disengage the locking mechanism 230. In one example, the security device 101 receives a command from the mobile device 206 to disable the locking mechanism 230 and, in response, the locking mechanism 230 receives a signal causing the engaging component to be disabled. In another example, a sensor 218 measures an RFID key fob and the monitor application 215 determines that the RFID key fob is within a predetermined distance and is associated with an identifier. In this example, in response to the determination, the locking mechanism 230 automatically disables the engaging component.

The remote device 209 may also include a locking mechanism 230 (not shown). The locking mechanism 230 can include shackle style lock that goes around a component (e.g., a metal tube supporting the headrest) of a headrest associated with a headrest or attaches to some other area of the vehicle to secure the security device 101 or remote device 209. In some embodiment, the locking mechanism 230 serves as a warning mechanism rather than a prevention mechanism. As an example, the locking mechanism 230 may include a magnet that adheres to a part of the vehicle, such as a door or metallic/magnetic portion. The locking mechanism 230 can include a sensor to differentiate when the magnet is affixed to the vehicle and when it is free from the vehicle. The monitor application 215 may trigger an alarm if the remote device 209 or the security device 101 is removed from an affixed surface of the vehicle.

When engaging, the locking mechanism 230 may include extending one or more legs or protrusions outward from the body. The protrusions may contact and apply a pressure to an interior surface of the cup holder such that the protrusions create static friction to prevent removal when an upward or extracting force is applied to the security device. The locking mechanism 230 may include a clutch mechanism or other force limiting mechanism to prevent damage to the cup holder of the vehicle 204. As an example, once the outward force of the protrusions meets or exceeds a threshold, the clutch mechanism can disengage or slip to allow rotation of the first portion relative to the second portion in the first direction without further engaging the locking mechanism 230. In some embodiments, the monitor application 215 may sense the activation of the clutch mechanism or that the locking mechanism 230 is fully engaged. The monitor application 215 may provide feedback to a user of the security device 101. The feedback can include providing visual feedback via a light (e.g., a light ring), providing audible feedback (e.g., a chirp or ding), send a message (e.g., a text message, a notification, or an email), or through some other feedback. In alternate embodiments, the locking mechanism 230 is a motorized locking system, a screw lock system (e.g., without a clutch mechanism), or another non-clutch-based mechanism for extending the plurality of legs 109. In at least one embodiment, the locking mechanism 230 engages based on non-friction-based mechanisms, such as, for examples, suction elements, magnets, and adhesives, among others.

The computing environment 203 can include one or more mobile devices 206, a security service 233, and a data store 236. The elements of the computing environment 203 can be provided via a plurality of computing devices that may be arranged, for example, in one or more server banks or computer banks or other arrangements. Such computing devices can be located in a single installation or may be distributed among many different geographical locations. For example, the computing environment 203 can include a plurality of computing devices that together may include a hosted computing resource, a grid computing resource, and/or any other distributed computing arrangement. In some cases, the computing environment 203 can correspond to an elastic computing resource where the allotted capacity of processing, network, storage, or other computing-related resources may vary over time.

The data store 236 can store various data that is accessible to the security device 101 and/or the mobile device 206, and is used by the networked environment to execute various processes and functions discussed herein. The data store 236 can be representative of a plurality of data stores 112 as can be appreciated. The data store 236 can include, but is not limited to, user data 239, operation data 242, and configuration data 245. In some embodiments, the user data 239, operation data 242, and/or configuration data 245 (or subsets thereof) are stored in storage 224, such as on the security device 101.

The user data 239 can include information associated with one or more user accounts. For example, for a particular user account, the user data 239 can include, but is not limited to, an identifier, user credentials (e.g., a username and password, biometric information, such as a facial or fingerprint image, cryptographic keys such as public/private keys, etc.), a name of an owner of the vehicle 204 in which the security device 101 is installed, contact information (e.g., phone number, email, etc.) for a user associated with the user account, user preferences for controlling processes in the networked environment 200, payment processing information (e.g., credit card number, expiration date, etc.), and information related to the vehicle 204 (e.g., a make, model, license plate number, etc.). In some embodiments, the user data 239, or a subset thereof, is stored in an encrypted format. For example, personally identifiable information (PII) associated with the user or the vehicle 204 can be encrypted such that access thereto requires a dual-authentication process, authentication of a public-private key pair, and/or other security measures.

The operation data 242 can include readings or measurements from the sensors 218 or other information related to the operation of the security device 101. The operation data 242 can include other historical information such as a history of mode transitions, a history of problems (e.g., data transmission errors, storage errors on storage 224 including file system corruptions, interruptions or disruptions to the power source 227, failure of the locking mechanism 230, identification of an attempt to remove the security device 101 from vehicle 204, etc.). The readings and historical information can include timestamps such that the operation data 242 provides a time-series of data describing activities occurring in or around the vehicle 204.

The configuration data 245 can include parameters for controlling operation of each sensor 218. Non-limiting examples of parameters include, but are not limited to, sensor modes, schedules for controlling sensor behavior, sensitivity levels, power levels, thresholds, and other suitable parameters. The configuration data 245 can include an identifier corresponding to each sensor 218. In some embodiments, portions of the configuration data 245 that are co-temporal can be stored as a multi-dimensional storage object in which each dimension corresponds to a particular sensor 218 and/or sensing mode (e.g., video, audio, environmental, etc.).

The configuration data 245 can include various threshold values, benchmark values, or ranges of values for controlling processes described herein. In some embodiments, the storage 224 includes configuration data 245 associated with each sensor 218 in communication with the security device 101. The configuration data 245 can include one or more rules and configuration options for each security device 101. The rules can be configured by a user via the mobile device 206. As an example, a first rule for a first security device 101 may relate to privacy and specify that the GPS location of the vehicle is not to be transmitted or stored in the data store 236. A second rule for a second security device 101 may specify that the GPS location should be determined and sent continuously or at a predetermined frequency whenever an event is detected (e.g., whenever the vehicle 204 exceeds predetermined speed limits, a subject enters or exits the vehicle 204, etc.). In some embodiments, a rule may be dependent on an identified current driver of the vehicle. As an example, the GPS location may be continuously sent when a teen son or daughter of an owner is driving the vehicle but not when an owner of the vehicle is driving. Other rules may include power usage restrictions (e.g.

converting to low-power mode automatically at a preset battery level, disabling a particular sensor 218 until a measurement from another sensor 218 meets a configured threshold, etc.), authentication requirements (e.g., multi-factor authentication, etc.), and other rules.

The configuration data 245 can be send to the security device 101, for example, upon setup of the security device 101 and upon changes thereafter. When the security device 101 is offline, any changes to configuration data 245 may be held until the next communication with the security device 101 or upon a scheduled event, such as while parked in a garage with high-speed internet. Changes to the configuration data 245 can be pushed by the security service 233 or pulled by the monitor application 215. The changes to the configuration data 245 may be sent as a complete set of configuration data 245 or can be sent as a delta such that only changed, added, or removed data is sent. Other non-limiting examples of configuration data 245 include, but are not limited to, audio level thresholds, temperature thresholds, humidity thresholds, pressure change thresholds, emitted or reflected signal thresholds (e.g., heat signals, ultrasonic signals, etc.), tilt thresholds, weight thresholds, vehicle-specific profiles, and combinations of thresholds. In one example, a first threshold for an audio sensor 218 comprises a value that, upon being exceeded by a reading of the audio sensor 218, causes the audio sensor 218 to transition from a lower power mode to a high power mode.

The security service 233 can be executed in the computing environment 203 to receive contextual data including sensor readings and other data from the security device 101. The security service 233 can receive, process, and respond to requests from the mobile device 206. The security service 233 can provide real-time data analyses, which can be used to determine a current status of the vehicle 204. The security service 233 can process the readings, compare the readings to user data 239, historical operation data 242, or configuration data 245, and generate various determinations based on the comparisons and other analyses. In one example, the security service 233 can receive and process a video stream from the security device 101. In this example, the security service 233 can execute object detection algorithms, machine learning algorithms, etc., on the video data for identifying features therein and determining if an event occurred, such as placement of an infant into the vehicle 204 or entrance of multiple subjects.

The mobile device 206 can include one or more displays 248, a security application 251, and one or more input devices 254. The security application 251 can be executed to monitor and control the security device 101. In some embodiments, the security application 251 can communicate with the monitor application 215 directly or via the security service 233. The security application 251 can communicate with the security service 233 to determine various information about the security device 101 including determining a current mode, a current location, a history of events, sensor measurement information, a lock stage of the locking mechanism 230, and various other details. The security application 251 can generate user interfaces to display the various information and receive edits from a user. The security application 251 can communicate those edits to the security service 233 or monitor application 215 to adjust configuration properties of the security device 101 and vehicle 204 and cause actions to be performed thereby. As used herein, "location" can refer to any suitable identifier, metric, measurement, or other value for indicating geographical position. Non-limiting examples of location include zip code, longitude and latitude, address, geocodes, and geohashes.

The mobile device 206 can be any network-capable device including, but not limited to, smartphones, computers, tablets, smart accessories, such as a smart watch, key fobs, and other external devices. The mobile device 206 can include a computing device with a processor and memory. The mobile device 206 can include a display 248 on which various user interfaces can be rendered by the security application 251 to configure, monitor, and control the security device 101. The security application 251 can correspond to a web browser and a web page, a mobile app, a native application, a service, or other software that can be executed on the mobile device 206. The security application 251 can display information associated with processes of the security device 101. The mobile device 206 can include an input device 254 for providing inputs, such as requests and commands, to the mobile device 206. The input devices 254 can include a keyboard, mouse, pointer, touch screen, speaker for voice commands, camera or light sensing device to reach motions or gestures, or other input device. The security application 251 can process the inputs and transmit commands, requests, or responses to the security device 101 or the computing environment 203 based thereon. According to some embodiments, the mobile device 206 is maintained by a system user and is often physically separate and remote from the security device 101.

The security application 251 can implement an application programming interface (API) for facilitating communication with the security device 101 and/or computing environment 203. The security application 251 can transmit, modify, and store various data on the mobile device 206, such as, for example, an identifier corresponding to the security device 101 (or a user thereof) and other user data 239, operation data 242, or configuration data 245. In one example, the security application 251 can transmit commands to the security device 101 or computing environment 203 that cause effect generation (e.g., audiovisual alerts, mic enablement, etc.) and/or adjust functions of the security device 101 or vehicle 204. In another example, the security application 251 transmits location data comprising a location of the mobile device 206 to the computing environment 203 that processes the location data to determine if the user is within a predetermined range of the vehicle 204.

When proximate to the security device 101, the security application 251 can communicate with the monitor application 215 via a local wireless communication, such as near field communication (NFC), Bluetooth, WiFi, or other wireless communications. The mobile device 206 may be considered proximate to the security device 101 when the mobile device 206 is within a wireless range of the security device 101 for the local wireless communication technology. In some embodiments, the monitor application 215 can transition to a different mode based on one or more mobile devices 206 entering or leaving the range of the wireless communication technology.

The remote device 209 can include one or more sensors 218b, one or more processors 216, one or more transceivers 221b, one or more storage devices 224b, and one or more power sources 227b. The remote device 209 can include a computing device with a processor and memory to execute an application to perform various functionality discussed herein. The remote device 209 may comprise a secondary device to receive sensor measurements remote from the security device 101. As an example, the remote device 209 may be positioned further toward a rear of the vehicle 204 than the security device 101 such that measurements from sensors 218b (e.g., a PIR sensor 218b or microwave sensor 218b, etc.) can collect measurements from a different perspective or position within the vehicle. In one example, the remote device 209 can be positioned in a rear cup holder, a door cup holder, a door storage area, affixed to a window, positioned in the truck, or located in another position. In another example, the remote device 209 is mounted to a rim of a wheel and includes GPS sensors (e.g., allowing for tracking of the location of tire if removed from the vehicle 204). The remote device 209 can include a battery power source 227b, a solar power source 227b, and/or may be coupled to a power source 227b of the vehicle 204. In some embodiments, the remote device 227b has a battery power source 227b and the security device 101 has a power source 227a that receives electrical energy from the vehicle 204.

The remote device 209 can communicate with the security device 101 via a transceiver 221b. The communication may utilize a close proximity and low power technology that may be wireless or wired, such as Bluetooth, NFC, Zigbee, Z-Wave, WiFi, or similar localized wireless RF communication. The remote device 209 may transmit measurements from sensors 218b to the monitor application 215 for further processing and transmission to the computing environment 203. In one embodiment, the remote device 209 reads measurements from sensors 218b at a frequency that is below the frequency of measurements read from sensors 218a to conserve power from power source 227b. In some embodiments, the remote device 209 only communicates with the security device 101. In at least one embodiment, the remote device 209 reads measurements at a lower sensitivity than the security device 101 to conserve power. As an example, the sensitivity of a first microwave sensor 218a is configured to be higher and use more power than the sensitivity of a second microwave sensor 218b. Similar to the security device 101, the remote device 209 can store sensor data locally on a storage 224b and transmit the sensor data from the storage 224b or can transmit the sensor data directly as read.

In some embodiments, the remote devices 209 are distributed around the interior and/or exterior of the vehicle 204, and each of the remote devices 209 can communicate with the security device 101 from its respective location. Accordingly, each of the remote devices 209 can be located in a position for optimally recording particular regions of the vehicle 204, for optimally detecting infant placement and abandonment, or other suitable goal.

The vehicle 204 can include one or more sensors 218c, an on-board diagnostics (OBD) port 257, and one or more transceivers 221c. The vehicle 204 can communicate with the network 212 via a wireless transceiver 221c or wired connection. It can be appreciated that vehicles 106 include various technologies for collecting data such as GPS systems, diagnostic systems, vehicle status systems, and other systems. The vehicle 204 may obtain vehicle information natively such as tire pressure, a current location, an engine temperature, vehicle interior temperature, exterior temperature, a status of whether the vehicle 204 is running, a position of each window of the vehicle 204, any outstanding service or maintenance issues of the vehicle 204, a speed of the vehicle 204, a direction of travel of the vehicle 204, a count of miles traveled since starting the vehicle 204, a status of whether each door is opened or closed, a status of whether or not each door is locked or unlocked, a status of whether the hood or trunk is open or closed, a status as to whether the gas cap is secured, engine ignition attempts, a change in fuel levels, changes in pedal positions, a status of whether the vehicle 204 is in drive, reverse, park, neutral or other drive configuration, a status of which gear the vehicle is in, a status of whether a seatbelt is buckled or unbuckled, a status of whether a seat is occupied (e.g., by a mass exceeding one or more predetermined thresholds), a deployment and/or integrity status of one or more airbags, entertainment system activity (e.g., current media input, output, and other information), and other information related to the current or historical state of the vehicle 204.

The security device 101 can communicate with the vehicle 204 to obtain the vehicle information via a wireless connection or a wired connection. As an example, the security device 101 may have a cable plugged into a USB port, the OBD system 257, or some other wired standard to request and receive the vehicle information. In some embodiments, the security device 101 includes an external component that is inserted into an OBD port or USB port, and transmits data therefrom to the security device 101. In some embodiments, the security device 101 can also receive a power supply from a wired connection with the vehicle 204. As another example, the vehicle information can be obtained by the security device 101 via a wireless connection, such as WiFi or Bluetooth. In some embodiments, the vehicle information is gathered from the mobile device 206, such as, for example, via CarPlay or Android Auto and sent to the security service 233 or monitor application 215 for further processing (or processed on the mobile device 206). In one embodiment, the monitor application 215, security service 233, or security application 251 can communicate with an API of a service provided by the vehicle manufacturer or a third party to obtain the vehicle information, such as, for example, Mercedes®'s MBUX®, General Motor®'s OnStar® service, Chrysler®'s UConnect®, Amazon®'s Alexa®, SiriusXM®, or some other service. The vehicle 204 may natively transmit some or all of the vehicle information to the third party service natively.

The networked environment 200 can include one or more external systems 259 with which the security device 101, vehicle 204, computing environment 203, mobile device 206, and remote device 209 communicate. The external system 259 can include, for example, a manufacturer or other third party system associated with the vehicle 204 (e.g., OnStar®, UConnect®, etc.). The external system 259 can include an e-commerce system, such as, for example, systems provided by Amazon® or Uber®, as well as various payment processing services, and systems associated with particular businesses such as a restaurant or retailer. The external system 259 can include one or more POS devices 261 that are configured to facilitate transactions. In one example, a POS device 261 includes a near-field communication-based (NFC) payment device configured to detect and communicate with the security device 101 to obtain payment processing information. The payment processing information (e.g., credit card information, etc.) can be stored on the security device 101 and/or in a profile stored at the computing environment 203 or mobile device 206.

The external system 259 can include a commerce service 263 configured to process requests and commands. In one example, the commerce service authenticates commands or requests associated with a POS device 161. In another example, the commerce service 263 receives requests to generate orders for products and/or services, such as food items at a restaurant or a car wash service. In response to receiving requests or commands, the commerce service 263 can authenticate the command or request based on user data 239 and/or other user data stored at the external system 259. In one example, the commerce service 263 requests user credentials from the computing environment 203 to verify an identity of a user account with which a command is associated. The commerce service 263 can receive readings, such as sensor readings from the sensor 218. In one example, the commerce service 263 receives location data from the sensor 218, and determines that the vehicle 204 is within a predetermined geofence associated with a business. In this example, in response to the determination, the commerce service 263 transmits one or more offers or other notifications (such as operating hours, navigation instructions, etc.) to the security device 101 or the mobile device 206. The monitor application 215 or security application 251 can process the offers or other notifications and cause the security device 101 to announce the offer as an audible alert.

Figure 3:
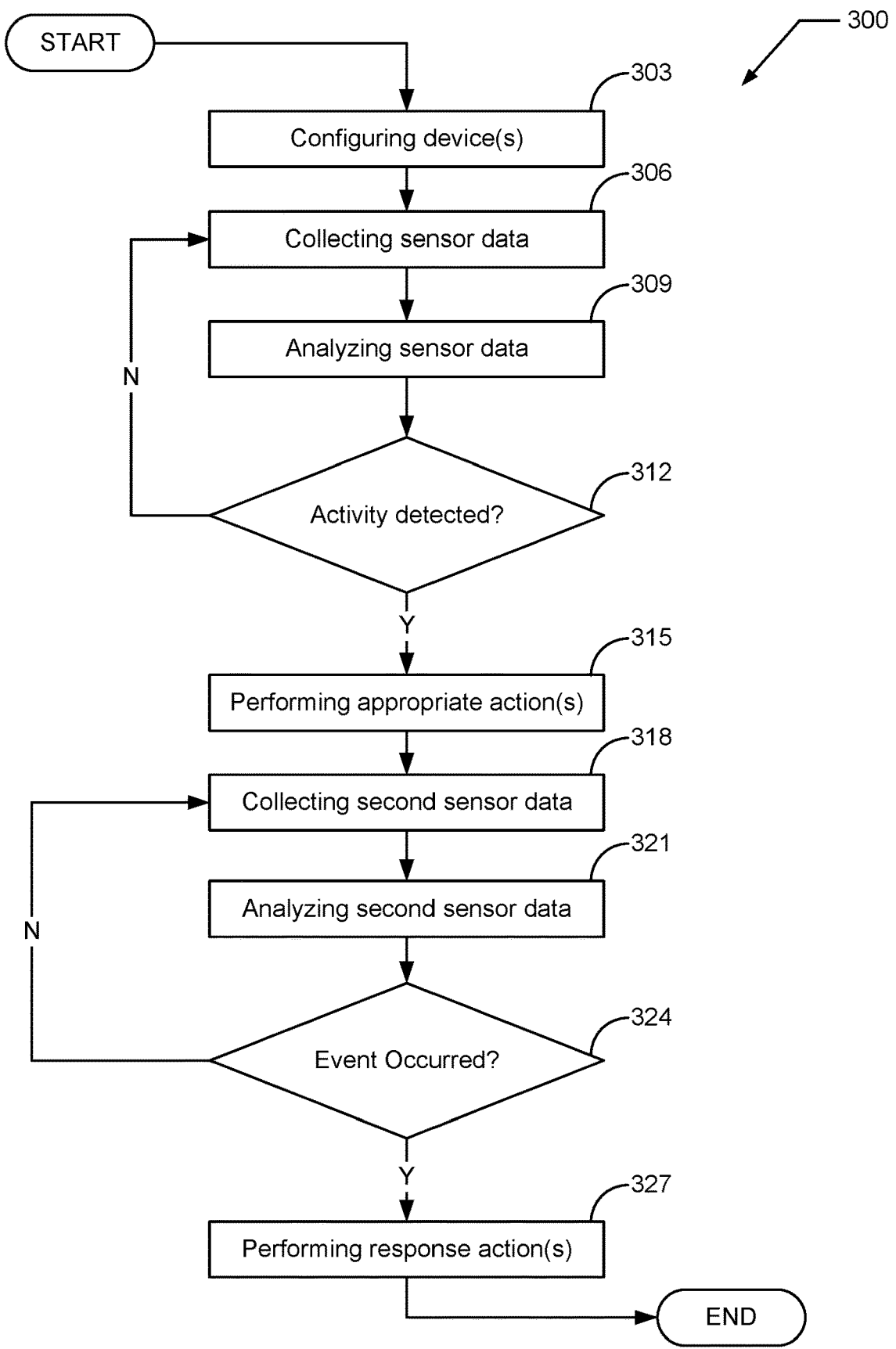
FIG. 3 is a flowchart of an exemplary detection process according to one embodiment of the present disclosure.
Figure 4:
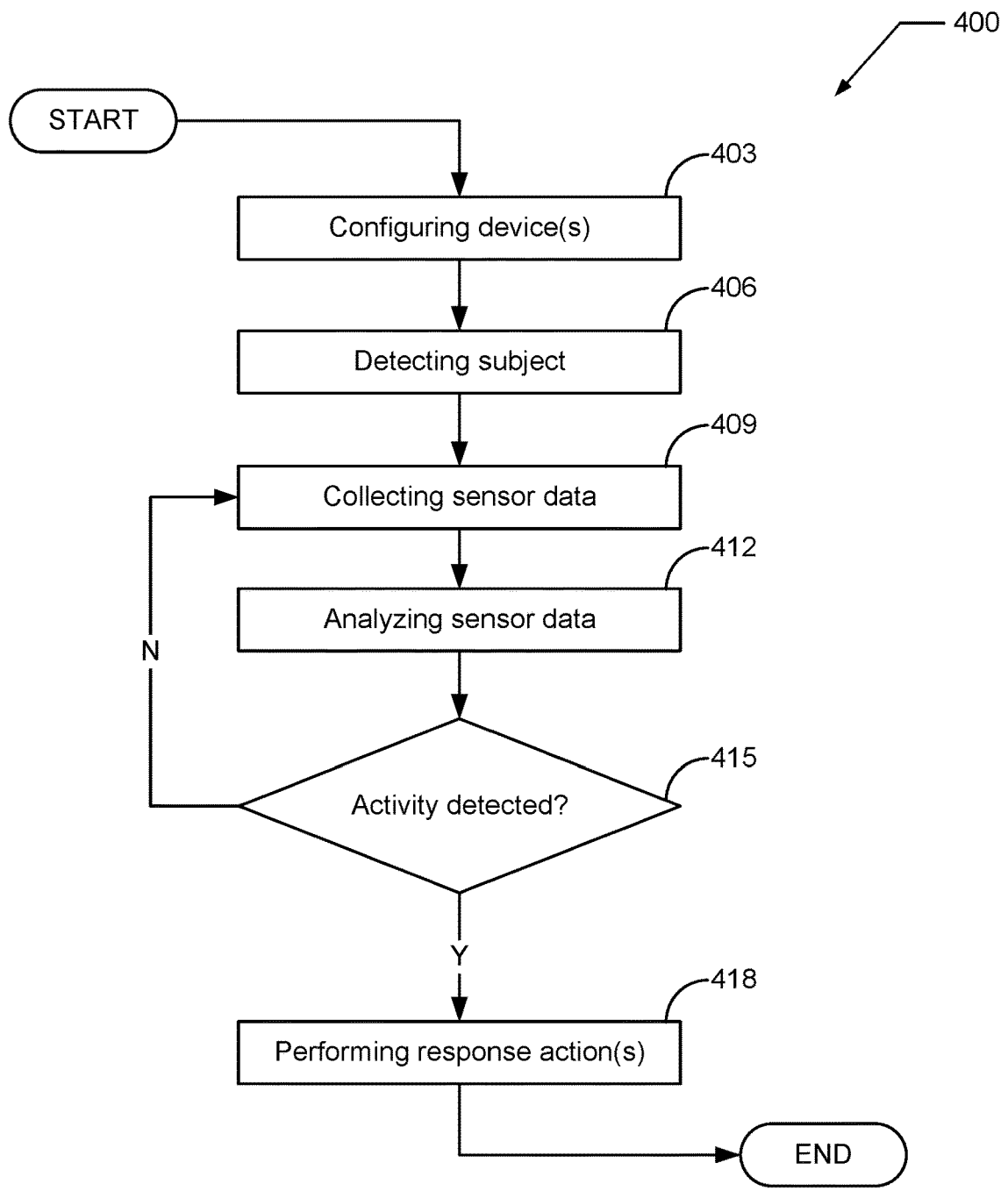
FIG. 4 is a flowchart of an exemplary vehicle monitoring process according to one embodiment of the present disclosure.
Figure 5:
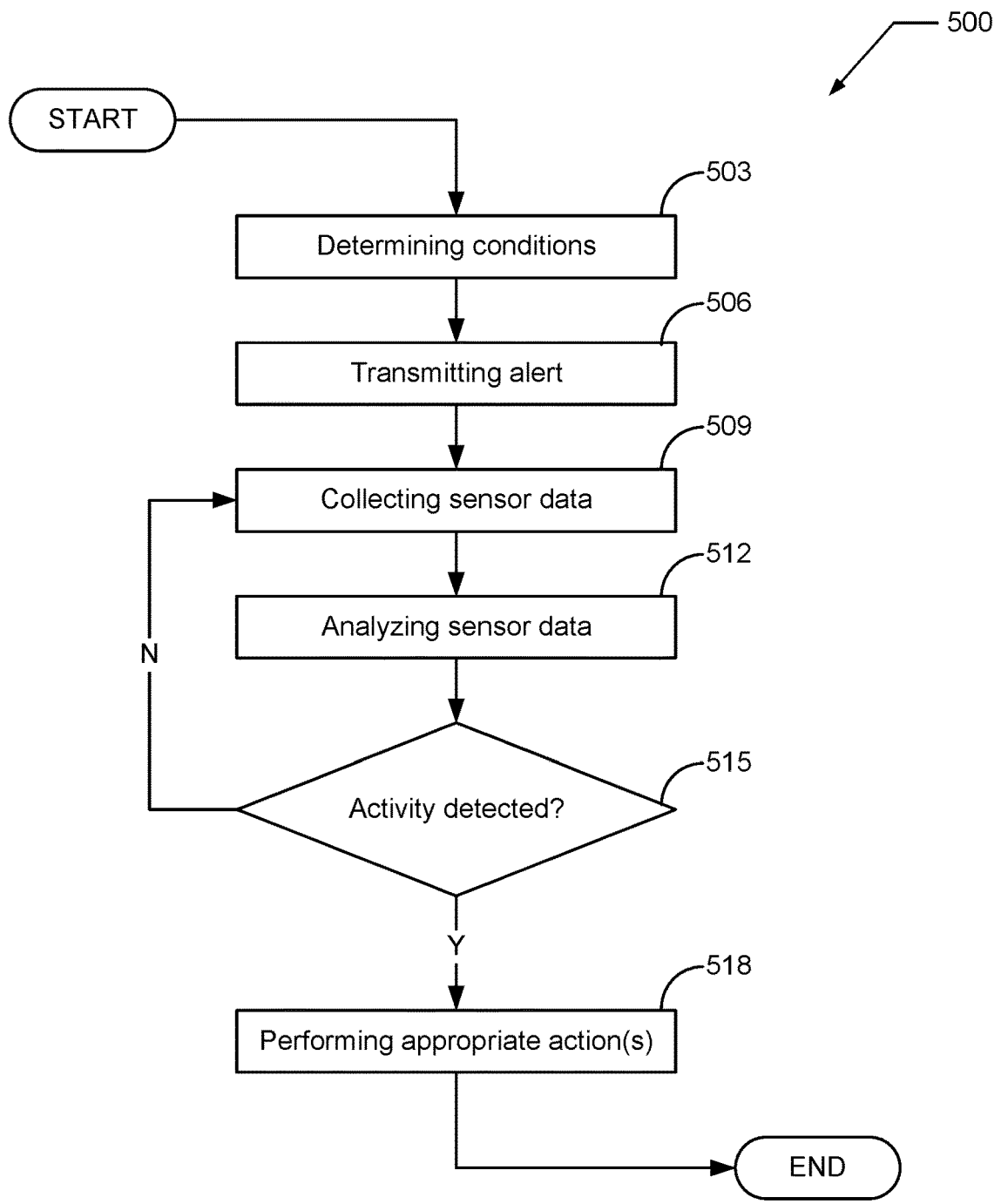
FIG. 5 is a flowchart of an exemplary vehicle monitoring process according to one embodiment of the present disclosure.

Reference is made to FIGS. 3-5, which illustrate exemplary flowcharts and workflows of the present system. As will be understood by one having ordinary skill in the art, the steps and processes shown in FIGS. 3-5 (and those of all other flowcharts and sequence diagrams shown and described herein) may operate concurrently and continuously, are generally asynchronous and independent, and are not necessarily performed in the order shown. In the proceeding description of FIGS. 3-5, various processes and functions are described as being performed by a security device (e.g., a security device 101 as shown in FIGS. 1A-B) and, in particular, a monitoring application running thereon (e.g., a monitoring application 215 as shown in FIG. 2); however, it will be understood embodiments are contemplated in which one or more of the described functions and processes are performed by other suitable elements of a networked environment in communication with the security device.

With reference to FIG. 3, shown is a flowchart of an exemplary detection process 300 according to one aspect of the present disclosure. For the purposes of describing exemplary performance of the present technology, the process 300 is described in the context of detecting the presence and absence of an infant within a vehicle. In various embodiments, by the process 300, a security device 101 is configured within a vehicle to detect the presence of an infant in the vehicle, and perform one or more appropriate actions based on monitoring the presence (or absence) of the infant. In one example, the security device detects a placement of an infant in the vehicle, determines that a driver exits the vehicle while the infant remains inside, and executes a first level of response by transmitting an electronic communication to a mobile device 206 that alerts the driver of the abandoned infant. In the same example, the security device 101 detects the continued presence of the infant, determines that an internal vehicle temperature and/or carbon monoxide level exceeds a predetermined safety range, and executes a second level of response by automatically sounding an audible alarm (e.g., the vehicle's car alarm, a sound system, etc.) and transmitting an emergency alert to local authorities.

At step 303, the process 300 includes configuring one or more security devices 101 and potentially one or more remote devices 209 within a vehicle 204. In one example, a security device 101 is installed in a cup holder and connected to a power source. In another example, the remote device 209 is inserted into a door receptacle, coupled to a seat, mounted in a dome light, or placed elsewhere in the vehicles. Other non-limiting examples of target sites include, but are not limited to, dashboards, compartments (e.g., glovebox, center console, etc.), air vents, arm rests, buckles, steering wheels, and windows. The security device 101 can be inserted in a disarmed state in which a locking mechanism 230 is disabled and an engaging component thereof is enabled. Inserting the security device 101 can include connecting the security device 101 to a power source 227, such as an auxiliary power outlet. In some embodiments, step 303 includes attaching one or more sensors 218 and/or remote devices 209 in or around the vehicle 204. For example, a sensor 218 for reading data from an OBD system 128 is inserted into an OBD port. In another example, a camera sensor 218 is secured to the dashboard. A sensor 218 can be oriented such that a viewing angle thereof includes a particular area, such as a rear interior of the vehicle 204. Multiple sensors 218 can be positioned such that phenomena may be detected in a substantial area of the vehicle 204 interior. In some embodiments, the remote device 209 can be mounted to a collar of a pet for precise measurements of body temperature, movement, position, and other aspects. Similarly, the remote device 209 can be positioned in a sock of an individual such as an infant or toddler.

Configuring the security device 101 can include connecting to a network (e.g., 3G, 4G, 5G, LTE, Bluetooth, Wi-Fi, internet, etc.), registering the security application 251 with the security device 101, powering-up the security device 101, initializing one or more of the sensors 218, and downloading and installing the security application 251 onto a mobile device 206 of the user. In some embodiments, registering includes providing the security application 251 with an identification number associated with the security device 101 (and/or the sensors 218). Configuring the security device 101 can include pairing the security device 101 with the mobile device 206, vehicle 204, a user account, and/or other computing devices or profiles. In at least one embodiment, pairing the security device 101 can include receiving information associated with the vehicle 204 and/or the user. For example, in response to receiving the activation signal, the security application 251 can launch a window or provide a form requesting a license plate, vehicle make, and vehicle model of the vehicle 204. In another example, the security application 251 can request the user capture a facial image of themselves or another subject (e.g., an infant, teenager, senior, etc.) and/or provides other credentials for use in securing access to the security device 101 and controlling performance of the same. The security application 251 may capture the facial image from various angles to build a 3D model of the subject for future comparison and recognition.

Configuring the security device 101 can include downloading a profile for configuring one or more sensors 218 and/or for communicating with an OBD system 257. The profile can be based on a make, model, and/or properties of the vehicle 204, a user account with which the security device 101 is associated, a desired operating mode of the security device 101, or other factors, such as physical characteristics of a subject to be monitored). In one example, the computing environment 203 receives subject characteristics including an age, height, weight, and facial image of a subject to be monitored. In response to receiving the characteristics, the computing environment 203 retrieves and transmits a particular profile from a plurality of profiles stored in the data store 236 or that is downloaded from a third party service. In response to receiving the particular profile, the monitor application 215 can recalibrate, for example, a PR sensor 218A and a weight sensor 218 (and/or one or more other sensor 218) to improve a quality of readings therefrom and/or to reduce a likelihood of false positives occurring. For example, based on the profile, a range parameter of the PIR sensor 218A is reduced to conform to the reduced dimensions of the subject. In another example, a profile for a vehicle 204 indicates that the vehicle 204 is a convertible. In this example, audio sensors are deactivated (e.g., to prevent false positives) and a camera sensor is calibrated to compensate for changing light quality (e.g., to reduce a risk of ambient light triggering a false positive or negative determination of vehicle occupancy). Configuring the security device 101 can include providing properties of a pet, such as a weight, age, color, type, breed, and size of a pet.

A selection can be received for a particular profile from a plurality of profiles and the selected profile can be downloaded and/or transmitted to the security device 101. The security device 101 can download a profile of the vehicle 204 based on make, model, and other information, such as information provided by a user to a security application 251. In one example, the security device 101 determines that vehicle 204 is manufactured by Buick™. In this example, the monitor application 215 communicates with the security service 233 and/or an external system 259 (e.g., hosted by the manufacturer) to identify and download a profile associated with the make of the vehicle 204. Continuing this example, the profile is processed and one or more calibration parameters are extracted that correspond to one or more sensors 218. The calibration parameter includes, for example, an updated value for a predetermined threshold that is used by audio sensors for detecting window breaks. The threshold can be a frequency and/or decibel threshold that is lowered to the updated value in response to the vehicle 204 having thicker windows than vehicles of other makes (e.g., which may result in sounds of window breaks having a lower frequency and/or lower volume).

In some embodiments, the security device 101 configures to a particular mode or setting based on a profile or user input. Non-limiting examples of modes include subject detection or monitoring modes (e.g., such as infant, child, teenager, or senior monitoring modes), vehicle entertainment system control modes, and commercial interaction modes (e.g., for facilitating transactions such as tolls, drive-thru's, etc.). In one or more embodiments, configuring the security device 101 includes selecting one or more, thresholds, actions, and/or workflows by which the security device 101 detects and responds to events.

In some embodiments, the security device 101 can include one or more speed delta thresholds, one or more predetermined safety threshold, sensor thresholds, or other thresholds. The speed delta threshold can be defined as an upper and/or lower bound of speed differential that triggers a security event. As an example, the user may configure the speed delta threshold of 10 miles per hour or 20% of total speed limit as an upper and/or lower threshold. Continuing this example, the security device 101 can trigger an event if a user meets or exceeds those thresholds (e.g. the user is traveling at or greater than 10 miles per hour over the speed limit, the user is traveling at or less than 10 miles per hour under the speed limit). Another user may set the speed delta threshold to 5 miles per hour.

The security device 101 can determine that one or more hazardous conditions or adverse driving conditions are present proximate to the vehicle, such as on a roadway that the vehicle is driving, within a predetermine radius of where the vehicle is driving, within a predetermined distance from a path along directions to a specific location, scheduled in a particular city that the vehicle is in or is intended to drive through (e.g., intended to drive through as per currently programmed GPS directions). The security device 101 can modify one or more thresholds based on the one or more hazardous conditions or adverse driving conditions. As an example, the security device 101 can increase or reduce the speed delta threshold based on the one or more hazardous conditions or adverse driving conditions. As an example, the security device 101 can determine that the roads may be icy based on a temperature in the current city being below 32 degrees Fahrenheit or 0 degrees Celsius. In response to determining that the roads may be icy, the speed delta threshold can be reduced to 50% of the configured value, 75% of the configured value, 10 mph less than the configured value or some other configured change. For example, the security device can determine the roads may be icy and reduce the speed delta threshold from 10 mph down to 5 mph. Each hazardous conditions and/or adverse driving conditions can be configured to modify or change the speed delta threshold (or other threshold value) a different or a same amount. In some embodiments, the thresholds can be configured on a driver by driver basis. As another example, in response to determining that it may be raining, one or more sensor thresholds can be modified. As an example, a sensor that detects proximity of objects to the vehicle (e.g., a microwave sensor, LiDAR sensor, etc.) may be configured for reduced sensitivity to avoid falsely identifying rain as an object that could damage the vehicle.

In one example, the security application 251 generates a user interface for configuring the security device 101 including selectable fields for response actions and escalating response workflows. In this example, based on one or more selections, the security application 251 generates a policy by which the security performs detection, monitoring, and alert processes. It will be understood and appreciated that modes, settings, rules, actions, thresholds, and policies may be suitably combined to achieve a desired performance state. For example, the monitor application 215 configures the security device 101 to an infant monitoring mode and an entertainment control mode. In some embodiments, a first security device 101 configures to a first mode, such as a commercial interaction mode, and a second security device 101 configures to a second mode, such as an infant detection mode.

In one example, the security application 251 receives a selection for a "child monitoring" mode and, in response, the monitor application 215 retrieves a profile (e.g., or other set of operating parameters and policies) and configures the security device 101 based thereon. Configuring the security device 101 to the child monitoring mode can include adjusting sensor threshold levels or other rules to detect the presence (or absence) of an infant within the vehicle 204. For example, a PIR sensor threshold is decreased such that presence of a larger subject is differentiable from a PIR signature of a child-sized subject. As another example, a weight sensor threshold positioned under a car seat is calibrated to a weight range associated with the seat weight and average child weight. The adjustment of sensor threshold levels and other rules can be performed based on one or more criteria of a subject to-be-monitored, such as, for example, age, weight, and height. For example, the monitor application 215 calibrates an ultrasonic sensor threshold to a first range in response to an age selection of 0-18 months and calibrates the ultrasonic sensor threshold to a second range, exceeding the first range, in response to an age selection of 3-5 years.

At step 306, the process 300 includes collecting sensor data, such as, for example, readings from a PIR sensor 218. Non-limiting examples of sensor data include vehicle statuses, signal intensities, temperature levels, weight values, audio recordings, visual recordings, and chemical signatures. In one example, as an infant is placed in a child safety seat within a vehicle, a PIR sensor 218 records an increase in signal intensity and a camera sensor captures a facial image of the infant. In another example, a sensor 218 connected to a vehicle's OBD port determines that a passenger door has been opened and records an increase in weight of a passenger seat. In the same example, the sensor 218 further determines that the vehicle is in motion and a seatbelt of the passenger seat is not engaged. In another example, an audio sensor records a subject's vocal command (e.g., "infant mode," "baby on board," "pet in car," or another phrase or keyword).

At step 309, the process 300 includes analyzing sensor data. Analyzing sensor data includes, but is not limited to, comparing sensor data to one or more threshold values, rules, and/or policies. In one example, the monitor application 215 compares a signal value from a PIR sensor to a predetermined threshold. In another example, the monitor application 215 applies a facial recognition or object recognition process to images from a camera sensor 218. In this example, the monitor application 215 computes a confidence score that corresponds to a likelihood of the images including an infant's face or body or pet. In another example, the monitor application 215 analyzes image data from a camera sensor to identify an animal in one or more frames of the image data and generate and track a movement pattern of the animal based on the image data.

In another example, the monitor application 215 compares readings from a PR sensor 218 to one or more predetermined threshold values for detecting live human presence. In another example, the monitor application 215 analyzes readings from multiple sensors 218 to identify a particular event or pattern, such as placement of an infant into the vehicle and engagement of an infant restraint system. In yet another example, the monitor application 215 analyzes readings from a heat sensor to determine if an infant body is generating body heat in the seat location. In one example, the monitor application 215 determines that, within a predetermined time period (e.g., 10 seconds, 1 minutes, 5 minutes, etc.), a PIR sensor 218A recorded a spike in reflected signal intensity and a door sensor 218B registered opening and closing of a passenger door. In another example, the monitor application 215 analyzes audio to detect a baby crying or making other baby noises.

At step 312, the process 300 includes determining that one or more thresholds are met. The threshold can include, for example, a discrete value or range of values to which sensor readings (or analyses thereof) are compared. In some embodiments, the threshold is referred to as an "infant detection" threshold. In response to determining that the threshold is met, the process 300 can proceed to step 315. In response to determining that the threshold is not met, the process 300 can proceed to step 306. It can be appreciated that the monitor application 215 can continue to monitor sensor data in steps 306, 309, and 312, while simultaneously proceeding to step 315 when activity is detected.

In one example, the monitoring application 215 computes a confidence score that readings from a camera sensor include a facial image of an infant or an object in an image is a pet. In this example, the monitoring application 215 compares the confidence score to a predetermined infant/pet detection threshold (e.g., a predetermined minimum confidence score) and confirms that the infant/pet detection threshold is met based on the confidence score meeting or exceeding the predetermined minimum confidence score.

In some embodiments, a plurality of thresholds are evaluated for satisfaction in order to determine that an infant detection threshold is met. In one example, the monitoring application confirms an infant weight threshold is met by comparing a weight recording to a predetermined range and determining that the weight recording falls within the predetermined infant weight range. In the same example, the monitoring application confirms an infant PIR threshold is met based on comparing a recorded PIR signal to a predetermined PIR value range (e.g., a pre-calibrated measurement associated with PIR-reflective subjects of infant/pet size). In this example, the monitoring application confirms an infant/pet detection threshold based on the determination that both the infant/pet weight threshold and infant/pet PIR threshold are met.

In another example, the monitoring application 215 confirms an infant detection threshold, one or more of facial recognition, proximity detection (e.g., from an ultrasonic sensor, PIR sensor, radar sensor, etc.), increased weight, seatbelt activation, detecting remote device, detecting voice command, or other aspect. The monitoring application 215 can calculate a weighted likelihood that the infant is present based on multiple sensors.

At step 315, the process 300 includes performing one or more appropriate actions. Non-limiting examples of actions include transmitting an alert, generating effects at the security device 101 and/or vehicle 204, opening one or more windows a predefined amount, dispensing water for a pet, changing a mode or other property of the security device 101, and generating user interfaces. In one example, in response to determining an infant is present in the vehicle, the monitoring application automatically transmits an electronic communication (e.g., a text message, email, push notification, or other electronic communication) to the vehicle 204, the mobile device 206, and/or a computing environment 203. In this example, in response to receiving the electronic communication, a security application 251 running on the mobile device 206 generates a user interface for controlling the security device 101 and/or monitoring the vehicle 204 and infant. In another example, the security application 251 renders a status alert indicia (e.g., a predetermined message or symbol) on a notification bar of the mobile device. In this example, the status alert indicia is configured to be unrenderable until the presence of the infant is no longer detected. In another example, the monitor application 215 activates a light source, such as an LED strip on the security device 101, thereby providing a visual indication of the infant's presence. In another example, the monitor application 215 plays an audio alert through the security device 101 or a sound system of the vehicle 204.

At step 318, the process 300 includes collecting second sensor data. Step 318 can occur continuously following the configuration of the security device 101 (e.g., step 303). Non-limiting examples of second sensor data include vehicle statuses, mobile device statuses, signal intensities, temperature levels, weight values, audio recordings, visual recordings, and chemical signatures. In one example, a PIR sensor 218A records a decrease in signal intensity in the front seat and a camera sensor 218B captures an image of the rear seat including a facial image of the infant or an image of a pet. In another example, a sensor 218 connected to a vehicle's OBD port determines that the vehicle doors have been locked via a key fob and/or that the key fob has moved out of range of the vehicle 204. In another example, a temperature sensor 218A measures an internal vehicle temperature and a thermal sensor 218B measures a temperature of the infant and/or pet. In another example, the monitor application 215 receives a GPS location from the mobile device 206. In another example, an audio sensor 218 records an internal vehicle audio feed capturing infant noise, such as breathing or crying or pet noise, such as barking, panting, meowing, scratching, or other pet noise.

At step 321, the process 300 includes analyzing second sensor data. Analyzing the second sensor data can include comparing the second sensor data to one or more predetermined thresholds, applying one or more rules or policies, and/or identifying a particular data sequence or pattern. In one example, the monitor application 215 computes a distance between a location of the mobile device 206 to a location of the security device 101 (or vehicle 204). In another example, the monitor application 215 compares a recorded audio clip of the vehicle interior to one or more reference audio clips of infant noise. In another example, the monitor application 215 computes a rate of temperature increase within and exterior to the vehicle 204. In this example, the monitor application 215 generates an estimated time period at which internal vehicle temperature may approach hazardous levels. In another example, the monitor application 215 identifies a particular pattern including a locking of the vehicle doors, a decrease in PR signal intensity from a PIR sensor 218A near a driver's seat of the vehicle 204, and/or an increase in signal intensity from an ultrasonic sensor 218B recording an exterior of the vehicle 204.

At step 324, the process 300 includes determining that an event occurred, is occurring, or is predicted to occur. In response to determining that an event occurred, the process 300 can proceed to step 327. In response to determining that an event did not occur, the process 300 can proceed to step 318. Non limiting examples of events include the driver, the infant, the security device 101, the mobile device 206, and/or a key fob exiting the vehicle 204, internal or external vehicle conditions becoming unsafe, detecting a particular input or signal (e.g., infant respiration or crying), and passage of a predetermined time period (e.g., following detection of infant presence or execution of an action, such as alerting a driver to infant abandonment). In one example, in response to a determination that readings from a carbon monoxide sensor 218 meet a predetermined threshold, the monitor application 215 determines an event is occurring (e.g., potential carbon monoxide poisoning).

In another example, in response to determining that an audio clip substantially matches a pattern for infant crying, the monitor application 215 determines an infant distress event occurred. The monitoring application 215 can determine an infant distress event by analyzing audio data, video data, and/or any other particular data set recorded by the security device 101 using machine learning techniques, natural language processing techniques, or a combination thereof. The monitoring application 215 can receive recorded data or stream live data. The monitoring application 215 can parse or analyze the data for pertinent information. For example, the monitoring application 215 can receive recorded audio measured by the security device 101. The recorded audio can include a baby crying or any other distinguishable baby sound. The monitoring application 215 can identify sound events in the audio recording. The monitor application 215 can analyze each sound event to determine if the sound event corresponds to a known sound. The monitoring application 215 can extract and/or isolate the sound events. The monitor application 215 can classify each sound event based on the sound events features (e.g., frequency, tone, range), results from a text to speech analysis, and/or comparison to known sounds (e.g., car horn, baby crying, loud music, etc.). The monitoring application 215 can employ machine learning techniques to extract and classify particular features from the recorded/streamed audio data. Once classified, the monitoring application 215 can compare the perceived audio extractions to known thresholds and recordings to determine if an infant or other individual is in the vehicle.

In another example, the monitor application 215 determines that the driver has exited the vehicle in response to detecting a decrease in signal from a PIR sensor 218, determining that a recorded seat weight decreased, and/or detecting opening and closing of the driver door. In this example, the monitor application 215 further determines that the infant is still present in the vehicle based on one or more sensor readings. Continuing this example, in response to determining that the driver has exited the vehicle and the infant potentially remains in the vehicle, the monitor application 215 determines that an infant abandonment event is occurring.

In another example, the monitor application 215 detects deployment of an airbag and/or a rapid deceleration of the vehicle 204, and, in response, determines that an accident has occurred. In another example, the monitor application 215 records a shift in acceleration (e.g., from stop to start) or gear (e.g., park to drive, neutral to drive, etc.) of the vehicle 204 and determines that a passenger seatbelt of the seat occupied by the infant is not buckled. In this example, based on the detected vehicle movement and unlatched seatbelt, the monitor application 215 determines that a hazardous event is occurring. In another example, the monitor application 215 detects activation of a key fob for locking the vehicle 204. In this example, the monitor application 215 determines that readings from one or more sensors recording the infant's activity have not significantly deviated as compared to historical readings from when infant presence was detected. Continuing the example, the monitor application 215 determines that the infant has been locked in the vehicle 204.

The process 300 (and other processes shown and described herein) can include an escalating workflow by which the monitor application 215 and/or other networked environment elements detect multiple events, such as, for example, abandonment of an infant and subsequent failure to address the abandonment within a predetermined time period. In one example, the monitor application 215 determines a first level event of infant abandonment has occurred and transmits an alert to the mobile device 206 (e.g., at step 327 described below). In this example, the monitor application 215 determines that a predetermined time period (e.g., 2 minutes, 5 minutes, 15 minutes, etc.) has elapsed and the infant is still present in the vehicle 204. Continuing the example, the monitor application 215 determines that a second level of event abandonment has occurred and transmits a notification to local authorities including the location of the vehicle 204. At step 327, the process 300 includes performing one or more response actions.

Non-limiting examples of actions include transmitting an alert, generating effects at the security device 101 and/or vehicle 204, changing a mode or other property of the security device 101 or vehicle 204, and generating user interfaces. In one example, the monitor application 215 transmits an alert to one or more emergency contacts. In this example, the alert includes the event detected (e.g., infant abandonment, infant distress, unsafe vehicle conditions, etc.), a timestamp at which the event occurred, and a current location of the vehicle 204 or security device 101. In another example, the monitor application 215 causes one or more vehicle effects including, but not limited to, activating a horn of the vehicle system 204, causing speakers of the vehicle 204 or security device 101 to emit a prerecorded alert, locking or unlocking the vehicle doors, and raising or lowering the vehicle windows. In another example, the security application 251 generates and renders a user interface by which a user monitors readings from the security device 101. In this example, the user interface includes selectable commands for performing various response actions, such as dismissing an alert, contacting emergency services, engaging a camera sensor 218, and re-calibrating the security device 101 (e.g., resetting and/or recalibrating thresholds of one or more sensors 218). In another example, the monitor application 215 determines a previous driver of the vehicle 204 and transmits an alert to a computing device associated with the previous driver. The monitor application 215 can determine a history of drivers, for example, by analyzing a record of when drivers' computing devices were present in or proximate to the vehicle 204, a record of current and historical driver seat configurations and/or weight readings, or a record of user interactions or inputs with the security device 101 and/or security application 251.

The response action can be based on a particular event determined to have occurred at step 324. In one example, the monitor application 215 determines that the infant has been abandoned in the vehicle 204 and, in response, transmits a notification to the mobile device 206. In another example, the monitor application 215 determines that a potential carbon monoxide poisoning event is occurring and automatically transmits a message to one or more emergency contacts. Escalating response actions can be performed in response to a predetermined schedule and/or determinations of one or more events. In an exemplary scenario, in response to the security device 101 detecting an infant abandonment event, the security application 251 performs a first level response action by generating an alert on an associated user's mobile device 206. In the same example, in response to detecting an unsafe vehicle condition (e.g., increase in vehicle cabin temperature beyond a predetermined threshold), the monitor application 215 performs a second level response action by activating a panic alarm of the vehicle 204. Continuing the example, in response to determining that a predetermined time period (e.g., 10 minutes) passes and the infant is still present in the vehicle 204, the monitor application 215 performs a third level response action by contacting emergency authorities and/or unlocking the vehicle doors.

FIG. 4 shows an exemplary vehicle monitoring process 400 according to one embodiment. For the purposes of describing exemplary performance of the present technology, the process 400 is described in the context of monitoring the activities of a teenager operating a vehicle in which one or more security devices are configured. In various embodiments, by the process 400, a security device determines that a subject (e.g., a teenager) enters a vehicle, detects potentially anomalous or policy-violating activity of the vehicle or subject, and, based on the detected activity, performs one or more appropriate response actions. In one example, the security device determines a teenager entered the vehicle by determining that the teenager's mobile device enters within a predetermined proximity of the vehicle and/or by detecting a communication pairing (e.g., a Bluetooth pairing, WiFi connection, etc.) between the mobile device and the vehicle. In the same example, based on readings from one or more sensors, the security device determines that the vehicle is being operated outside of a predetermined window or curfew (e.g., 6:00 AM-10:00 PM, after sundown, etc.), the vehicle is currently located outside of a predetermined geofence, the vehicle speed is in excess of a predetermined threshold, the vehicle speed is over a current speed limit in excess of a predetermined threshold, a number of subjects in the vehicle exceeds a predetermined maximum, and one or more seatbelts of occupied seats are not engaged. Continuing the example, the security device transmits an alert to a second mobile device (e.g., a mobile device of the vehicle owner, a parent, or guardian) and/or emits an audible warning within the vehicle, thereby alerting the teenager and other occupants to the detected activity.

At step 403, the process 400 includes configuring one or more security devices 101. Configuring the security device 101 can be performed similar to step 303 of the process 300 (FIG. 3). In one example configuring the security device 101 includes registering one or more mobile devices 206 with the security device 101, a security application 251, and/or the computing environment 203. In another example, configuring the security device 101 includes receiving selections for a driving curfew (e.g., a time period during which the teenager is permitted free use of the vehicle 204) and a safety region (e.g., a geofence defining an area in which the vehicle 204 may be freely operated). In another example, configuring the security device 101 includes receiving a blacklist of audio content (e.g., music, artists, vocabulary, etc.) forbidden within the vehicle 204. In one embodiment, the monitor application 215 can record an audio segment and process the audio segment to identify a song in the audio segment. In another example, configuring the security device 101 includes linking a security application 251 with one or more applications, such as, for example, navigation applications, vehicle control applications, and messaging applications.

In an exemplary scenario, a parent desires to monitor driving safety and behavior of their teenager by configuring the security device 101 within a vehicle 204. In this scenario, configuring the security device 101 includes downloading one or more versions of a security application 251 to a first mobile device 206A controlled by the parent and a second mobile device 206B controlled by the teenager application 251. From the first mobile device 206A, the monitor application 215 receives selections for a teenager monitoring mode, an identifier with which the security device 101 is associated, and an identifier with which the second mobile device 206B is associated. The security application 251 running on the second mobile device 206B receives a command to pair the second mobile device 206B with the security device 101, for example, by enabling location tracking of the second mobile device 206B within a predetermined proximity of the security device 101 and enabling application monitoring functions (e.g., to detect whether the teenager is distracted by their device while driving).

At step 406, the process 400 includes detecting a subject entering the vehicle 204. Exemplary processes for detecting entrance of the subject to the vehicle 204 are described in U.S. patent application Ser. No. 16/988,447, which is incorporated herein by reference as if set forth in its entirety. In one example, detecting the subject entrance includes determining that a PIR sensor 218A and/or an ultrasonic sensor 218B records an increased signal intensity. In another example, detecting the subject entrance includes determining that a location of an associated mobile device 206 is within a predetermined range of the security device 101 or vehicle 204. In another example, detecting the subject entrance includes successful Bluetooth, NFC, Zigbee, WiFi connection between the mobile device 206 and the security device 101 or vehicle 204.

At step 409, the process 400 includes collecting sensor data. Non-limiting examples of sensor data include vehicle statuses, mobile device statuses, signal intensities, temperature levels, weight values, audio recordings, visual recordings, and chemical signatures. In one example, a chemical sensor 218 detects air quality and tests for a plurality of chemical signatures. In another example, an audio sensor 218 collects an audio clip of conversation occurring in the vehicle 204 and/or music playing through a sound system. In another example, a sensor 218 in communication with an OBD port records weight values from weight sensors built into vehicle seats. In the same example, the sensor records seatbelt engagement statuses for each vehicle seat. In another example, a location sensor 218 records a speed and current location of the vehicle 204.

At step 412, the process 400 includes analyzing sensor data. Analysis of the sensor data can be performed substantially similar to steps 309 and/or 321 of the process 300 (FIG. 3). In one example, the monitor application 215 compares chemical signature intensities to a calibration scale for determining the presence of controlled substances. In another example, the monitor application 215 performs a speech processing technique on a recorded audio clip to determine if one or more portions include particular language (e.g., forbidden language and music or a predetermined keyword, such as a panic word). In another example, the monitor application 215 compares a location of the vehicle 204 to a predetermine geozone. In another example, the monitor application 215 computes a number of vehicle passengers by comparing seat weight values to a predetermined threshold. In another example, the monitor application 215 compares a current speed of the vehicle 204 to predetermined speed limits associated with a current vehicle or security device location.

At step 415, the process 400 includes determining that one or more activities are occurring, have occurred, or are predicted to occur. In response to determining that an activity occurred, the process 400 can proceed to step 418. In response to determining that no activity occurred, the process 400 can proceed to step 409. Non-limiting examples of activities include reckless, unpermitted, or illegal driving, consumption or transportation of controlled substances, presence of additional passengers, playing of blacklisted media, discussing blacklisted terms, deploying vehicle safety measures (e.g., airbags, locks, etc.), and interacting with a mobile device 206. In one example, the monitor application 215 computes an average volume (e.g., in decibels) of a vehicle audio feed and compares the average volume to a predetermined threshold. In this example, the monitor application 215 determines that the average volume exceeds the predetermined threshold and, therefore, distractive activity is occurring in the vehicle 204.

In another example, the monitor application 215 determines that a chemical signature for marijuana (or other drug/substance) exceeds a predetermined parts-per-million threshold. In this example, the monitor application 215 determines that transportation or consumption of marijuana occurred in the vehicle 204. In another example, the monitor application 215 computes a similarity score between a vehicle audio clip and blacklisted media content. In the same example, based on the similarity score satisfying a predetermined threshold, the monitor application 215 determines that blacklisted media content is playing in the vehicle 204. In another example, the monitor application 215 determines that the mobile device 206 received inputs while the vehicle 204 was in motion. In this example, the monitor application 215 determines that the teenage driver is engaging in distracted driving behavior. In another example, the security application 251 determines distracted driving behavior occurs by reading a state of the mobile device 206 and detecting interaction with one or more applications (e.g., texting applications, social media applications, etc.). In another example, the monitor application 215 determines that unpermitted driving is occurring based on a determination that the vehicle 204 is operating outside of a predetermined time period (e.g., 6 AM-10 PM) and/or geofence (e.g., 10 miles, 50 miles, or 100 miles from a predetermined location). In another example, the monitor application 215 determines that illegal driving is occurring based on a determination that the vehicle speed violates speed limits or a detected number of vehicle passengers (e.g., 3 passengers, 4 passengers, etc.) exceeds a legal limit (e.g., 1 passenger). In another example, the monitor application 215 determines that an airbag deployed and an acceleration of the vehicle 204 decreased in excess of a predetermined threshold. In this example, the monitor application 215 determines that a collision or other accident potentially occurred.

The monitor application 215 can calculate a safety score for driving of the user. The safety score can be based on a variety of factors as discussed herein, such as on the frequency of lane changes, the amount of maneuvering performed, a rate of breaking, a rate of acceleration, and other driving skill-based factors. The score can be calculated over time and updated in real-time. Multiple scores can be calculated for different time periods. For example, the monitor application 215 can calculate a score from when the driving started and a score for the most recent five minutes of driving to ensure that the driver continues safe driving consistently over the course of a drive. The monitor application 215 can also monitor for changes in behavior, such as decreases in score over time. If the score falls below or meets a predetermined threshold (e.g., below 65 out of 100 points), the monitor application 215 can determine unpermitted driving is occurring. At step 418, the process 400 includes performing one or more response actions.

Non-limiting examples of response actions include transmitting alerts (e.g., to emergency services or to a mobile device 206 of a vehicle owner, parent, guardian, etc.), disabling applications on the mobile device 206 of the teenager, shutting down the vehicle 204, engaging one or more safety features (e.g., such as a governor limiting a maximum speed or acceleration of the vehicle 204), disabling a media system of the vehicle 204, generating in-vehicle behavior and driving performance reports, and initiating a speaker function to allow a remote user to make announcements via the security device 101 and a second mobile device 206. In one example, the monitor application 215 causes the security device 101 to emit a prerecorded message, such as a curfew warning or other safety alert. In another example, the monitor application 215 causes the vehicle 204 to artificially limit vehicle speed to a predetermined level. In another example, the security application 251 blocks interaction of the teenager with other applications while the vehicle 204 is running.

FIG. 5 shows an exemplary vehicle monitoring process 500 according to one embodiment. For the purposes of describing exemplary performance of the present technology, the process 500 is described in the context of detecting and monitoring the activities of a senior citizen (referred to herein as the "senior) operating a vehicle in which one or more security devices are configured. In various embodiments, by the process 500, a security device alerts a subject (e.g., a senior) as to potentially hazardous road conditions, determines the subject enters a vehicle, monitors and evaluates driving behavior of the subject, and, based on the evaluation, performs one or more appropriate actions. In one example, the security device determines potentially hazardous road conditions including ice and rain and transmits an alert to a subject's mobile device. In the same example, the security device determines that the subject has entered and is operating the vehicle. In the same example, based on readings from one or more sensors, the security device determines that the vehicle speed is in excess of a predetermined threshold and detects anomalous braking behavior. Continuing the example, the security device transmits an alert to a second mobile device (e.g., a mobile device of an emergency contact, such as a relative or care center), generates a report of the subject's driving behavior, and uploads the report to a computing environment such that the report is accessible the second mobile device (e.g., via a security application running on the device).

At step 503, the process 500 includes determining current conditions, such as for example, weather, traffic, and safety conditions in a region at which the security device 101 is located. Step 503 can be initiated in response to detecting interaction of a subject (e.g., a senior) with a vehicle 204 or can be performed continuously to monitor as conditions change. In one example, the monitor application 215 performs step 503 in response to determining that the senior or a mobile device 206 has moved with a predetermined proximity of the vehicle 204. Step 503 can be initiated according to a predetermined schedule or in response to receiving user input (e.g., at the security application 251). In one example, the security application 251 automatically performs step 503 each morning at 7:00 AM. In another example, the security application 251 or monitor application 215 receive a voice command requesting current conditions.

In some embodiments, the security device 101 communicates with an external system (e.g., a weather system, traffic monitoring system, etc.), to identify current conditions such as precipitation, air quality, visibility, road quality, temperature, wind speed, and reported accidents. The monitor application 215 or security application 251 can compare the current conditions and/or forecasted conditions (where current conditions and/or forecasted conditions will be referred to only as current conditions herein) within a predefined window of time to predetermined thresholds and, based on the comparison, determine if potentially hazardous conditions are present. Potentially hazardous conditions, or adverse driving conditions, can include but are not limited to icy roads, dense fog, inclement forest fire, heavy rain, strong winds, heavy snow, potholes, construction, police radar, any combination thereof, or any particular condition that is detrimental to drive in. For example, the monitor application 215 compares a current precipitation level and temperature to predetermined thresholds and determines that icy conditions may be present. In another example, the security application 251 determines that a level of traffic congestion exceeds a predetermined maximum. The monitor application 215 or security application 251 can provide a summary of current conditions.

At step 506, the process 500 includes transmitting an alert to one or more mobile devices 206 with which a senior is associated. The alert can include a summary of current conditions and/or determinations that current conditions are potentially hazardous. The alert can be transmitted to a mobile device 206 of the senior and a second mobile device 206 of a predetermined contact (e.g., a care provider, child, etc., of the senior). The alert can include a current location of the vehicle 204 and/or the senior's mobile device 206. The alert can be generated in the vehicle 204 via a speaker or display associated with the security device 101 or vehicle 204.

At step 509, the process 500 includes collecting sensor data. The sensor data can be collected during operation of the vehicle 204, before or after operation, or without the vehicle being operated. Non-limiting examples of sensor data include vehicle performance data (e.g., speed, braking, acceleration, etc.), vehicle statuses (e.g., airbag deployment, seatbelt engagement, in drive including a current gear, in reverse, whether a trailer or other device is connected, etc.), road conditions (e.g., temperature, grip, current bank of the road, the existence of potholes or other road hazards, roadwork zones, etc.), location data, audio and visual data, signal intensity data (e.g., from a PIR sensor, ultrasonic sensor, etc.), and biometric data (e.g., facial recognition results, body temperature, etc.). In one example, a sensor 218 connected to the vehicle OBD port reads a status of the driver's seatbelt. In another example, a light sensor 218 measures an estimated visibility level through the windshield of the vehicle 204. In another example, a camera sensor 218 determines that the posture and/or gaze of the senior is outside of a predetermined range of positions (e.g., the senior is not properly oriented in the seat, is not focused on the road, etc.). In another example, an audio sensor 218 records a vocal command from the senior. In another example, a sensor 218 detects the entrance of the senior into the vehicle 204.

At step 512, the process 500 includes analyzing sensor data. Analyzing the sensor data can include comparing sensor readings to predetermined thresholds, applying rules or policies to the sensor data, and identifying particular data sequences and patterns. In one example, the monitor application 215 performs voice recognition on an audio clip and determines that the audio clip includes a particular keyword or phrase (e.g., cries for help, "I am lost," "take me home," "call my daughter," etc.). In some embodiments, the keyword may be preceded by a signal word such that if the signal word is not determined, further audio processing is not performed for privacy reasons. In another example, the monitor application 215 compares a visibility level to a predetermined visibility threshold. In another example, the monitor application 215 compares a measured vehicle speed to a posted speed limit with which a location of the vehicle 204 is associated. In another example, the monitor application 215 computes a distance between a current vehicle location and a predetermined location (e.g., the senior's home address), and compares the distance to a predetermined distance threshold.

At step 515, the process 500 includes determining that one or more activities occurred, are occurring, or are predicted to occur. In response to determining that an activity occurred, the process 500 can proceed to step 518. In response to determining that no activity occurred, the process 500 can proceed to step 509. Non-limiting examples of activities include driving too fast or slow (e.g., as compared to a flow of traffic, posted speed limits, etc.), aggressive, hesitant, or slow maneuvering or braking, entering or exiting a predetermined region (e.g., a geofence), unsafe vehicle conditions (e.g., mechanical or electrical failure, over- or under-pressured tires, unbuckled seat belt, deployed airbag, etc.), unsafe subject conditions (e.g., the subject appears to be sleeping, unfocused, or unresponsive), when a driving score associated as discussed herein falls below a predefined threshold, and detection of unsafe road conditions (e.g., icy roads, poor visibility, high winds, etc.). In some embodiments, an activity includes receiving a particular input from the subject, such as a predetermined keyword. In one example, the monitor application 215 determines that the senior spoke a predetermined key phrase "I am lost," thereby indicating that the subject requires directional guidance or additional assistance. In another example, the monitor application 215 determines that the vehicle 204 is being operated during a prohibited time period (e.g., 11:00 PM-5:00 AM, after sundown, etc.). In another example, the monitor application 215 determines a location or travel path of the vehicle 204 deviates from a predetermined location or travel path. In this example, the monitor application 215 determines that the senior is potentially lost or confused. The monitor application 215 can determine that a direction of travel differs from an expected direction of travel. In some examples, the monitor application 215 may determine that a time or distance of travel in an unexpected direction exceeds a predefined threshold and determine the driver is likely lost. The monitor application 215 can determine that the vehicle 204 has entered onto a highway or freeway and determine that configuration data 245 indicates highway or freeway driving is not permitted.

At step 518, the process 500 includes performing one or more appropriate actions based on the detected activity. Non-limiting examples of appropriate actions include transmitting an alert, generating a report of the subject's driving behavior, generating a user interface for monitoring the subject and/or vehicle, generating one or more effects via the security device or vehicle (e.g., prerecorded sounds, lights, etc.), communicating with emergency services, initiating a microphone function by which a second subject uses a mobile device to speak through the security device, causing a GPS system to display navigation instructions to a requested or predetermined destination, adjusting one or more properties, functions, or processes of the vehicle, or performing other activities as described herein.

The alert can include, for example, an email, push alert, text message, instant message, phone call, or other notification. The alert can include, for example, an electronic message indicating one or more activities. In one example, in response to determining that the senior entered the vehicle 204, the monitor application 215 transmits a push notification to a mobile device 206 of a predetermined emergency contact. In another example, in response to detecting a key phrase "I am lost," the monitor application 215 transmits a location of the vehicle 204 to a mobile device 206 of an emergency contact. In this example, a security application 251 and/or computing environment 203 streams a virtually live feed of data from the security device 101, thereby providing the emergency contact with a substantially real-time overview of vehicle location and status. In one example, the monitor application 215 detects airbag deployment and determines that the vehicle 204 likely experienced a collision. The mobile application 215 can verify that a collision occurred using one or more other sensors, such as, for example, an accelerometer to verify that both 1) an airbag was deployed, and 2) a large change in speed occurred. In this example, the monitor application 215 automatically transmits a location of the vehicle 204 to emergency services and causes the security device 101 to emit a notification alerting the senior that emergency services have been contacted.

Adjusting the properties functions, or processes of the vehicle includes, but is not limited to, automatically shutting down the vehicle engine, enabling a speed limiter or governor, and activating vehicle headlights. In one example, the monitor application 215 determines that the senior entered the vehicle 204 during a predetermined time period (e.g., sundown) and prevents ignition of the vehicle engine. In another example, the monitor application 215 detects icy road conditions and automatically engages a traction control function of the vehicle 204. In another example, the monitor application 215 detects that the vehicle 204 has experienced a loss of traction and, in response, automatically engages a traction control function of the vehicle 204. The monitor application 215 can trigger effects, such as, for example, playing a computer voice alert that describes current road and weather conditions. In one example, the monitor application 215 automatically plays a condition alert upon detecting entrance of the senior to the vehicle 204. The monitor application 215 can generate or update a driving performance report based on sensor readings and/or detected behavior.

The monitor application 215 can analyze the driving performance report, including historical driving performance data, to determine if the senior's driving ability is improving or degrading over time. In one example, the monitor application 215 determines that five instances of excess speed and seven instances of aggressive braking occurred during a senior's operation of the vehicle 204. In this example, the monitor application 215 compares the excess speed event count and aggressive braking event count to historical levels and determines that the senior demonstrates increasing levels of potentially hazardous or reckless driving. In the same example, the monitor application 215 automatically increases a frequency and/or volume of assistive alerts, such as speed advisories, played through the security device 101 or sound system of the vehicle 204. In another example, in response to detecting aggressive brake application, the monitor application 215 causes the vehicle 204 to adjust a sensitivity of the vehicle brake pedal and/or limit a maximum acceleration of the vehicle 204. In some embodiments, the monitor application 215 transmits vehicle performance and driver behavior reports to a third party, such as a rental company, insurance agency, or emergency service.

It is understood that while various features and types of sensors may be described with respect to monitoring of a type of person, such as a pet, infant, baby, toddler, teen, or senior, the processes and features described herein can be applied to any person including a pet, infant, baby, teen, or senior, among others. As a non-limiting example, the monitor application 215 can detect that a senior or pet has been left in a vehicle and according to process 300.

The security device 101, computing environment 203, and mobile device 206 can record sensor data during an event and provide a user interface on the display 248 (or via a non-mobile computer) that replays the event. As an example, a parent may sit with a teen and discuss the events that occurred while playing back the teen using drugs, speeding, and picking up a group of friends. The playback may be provided in increased or reduced speed (e.g., 0.5× speed, 1× speed, 2× speed, 4× speed, or some other playback speed). In some embodiments, the user may save the event data for later use. The data stored can also correspond to all interactions with the vehicle, not just those during an event. As one example, a parent may playback a teen driver not speeding when pulled over by authorities and given a ticket for doing so. In one embodiment, the system can provide an exported version or rasterized version for use as evidence as to a cause of an accident or to prove the innocence of an alleged crime, such as a speeding ticket or a hit and run. The data can include measurements from various sensors (including calculated values) such as speed and direction of travel, impact data and data on any maneuvers prior to, during, or subsequent to the impact, GPS or location data, cellular phone connectivity and usage data, video and audio feeds, and other data as discussed herein.

Figure 6A:
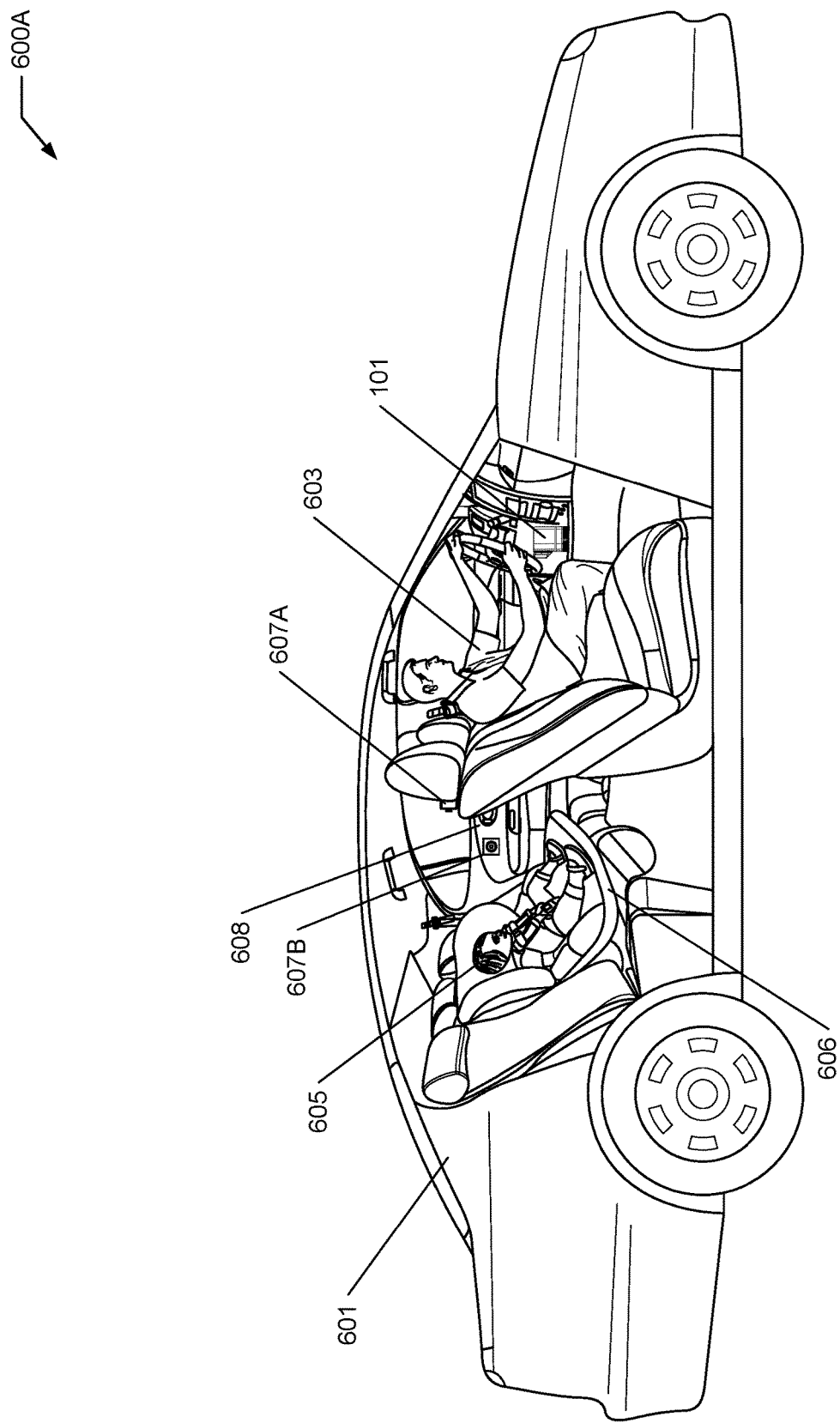
FIG. 6A illustrates exemplary vehicle environments according to one embodiment of the present disclosure.

FIG. 6A shows an exemplary vehicle environment 600A including a vehicle 601 and a driver 603. The vehicle 601 can be substantially similar to a vehicle 204 (FIG. 2). A security device 101 (FIG. 1) can be positioned and secured into the vehicle 601. The security device 101 can be configured in various locations including, but not limited to, cup holders, door frames, door panels, safety grips, windows, windshields, dashboards, seats, seat backs, seat headrests, seatbelts, under-seat compartments, above-seat compartments (e.g., sunglass holders, etc.), vehicle cabin ceiling, vehicle cabin flooring, trunk compartments, vehicle exterior, and other suitable locations. Multiple security devices 101 can be configured in and/or on the vehicle 601.

The security device 101 can receive readings from sensors 607A, 607B to detect various activities occurring in and around the vehicle 601, such as, for example, entrance and exit of the driver 603 or presence of an infant 605. The sensors 607A, 607B can be substantially similar to sensors 218 (FIG. 2). In some embodiments, the sensor 607A and/or the sensor 607B are security devices (e.g., security devices 101) or remote devices (e.g., remote devices 209 as shown in FIG. 2). In an exemplary scenario, the driver 603 places the infant 605 into a car seat 606. The sensor 607A is located on the back of the driver seat and opposite the car seat 606. The monitor application 215 can use the sensor 607A to capture an image of the car seat 606 including the face of the infant 605. The sensor 607B is located on a rear door 608 and measures an increase in PR signal intensity. The security device 101 determines that the PR signal intensity meets a predetermined threshold and the image of the car seat 606 includes an infant face. In response to determining threshold satisfaction and the presence of an infant face, the security device 101 determines that the infant 605 has been placed into the vehicle 601. The security device 101 performs appropriate actions, such as emitting an audible alert to the driver 603 and causing a security application running on a smartphone of the driver 603 to render alert indicia in a notification bar.

Figure 6B:
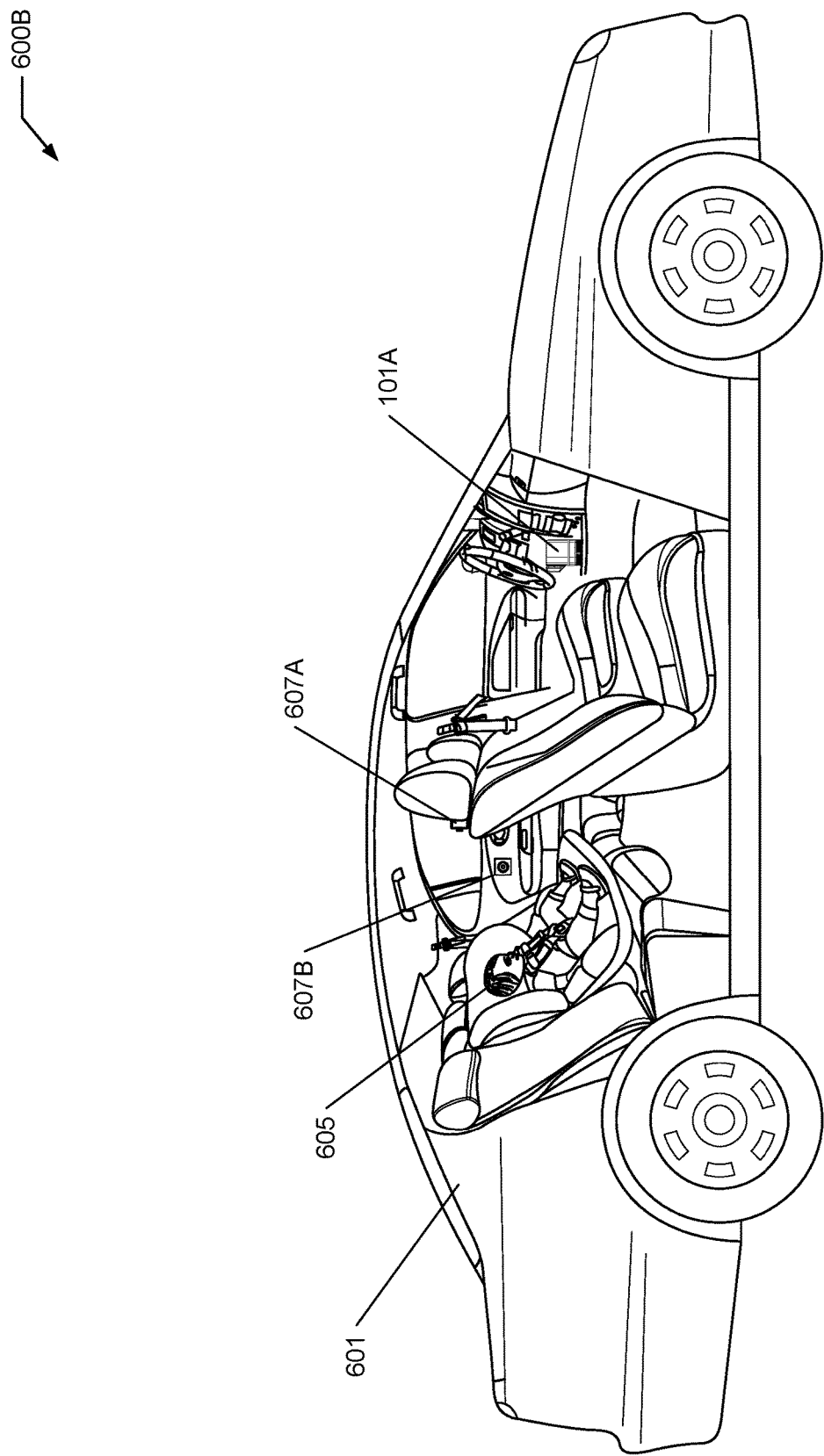
FIG. 6B also illustrates exemplary vehicle environments according to one embodiment of the present disclosure.

FIG. 6B shows an exemplary vehicle environment 600B including the vehicle 601 and the infant 605. The vehicle environment 600B may be subsequent in time to vehicle environment 600A. As shown, the driver 603 (FIG. 6A) has exited the vehicle 601 while leaving the infant 605 therewithin. In an exemplary scenario, the security device 101 determines that the driver 603 has exited the vehicle 601 by detecting a locking signal from a key fob, by determining that a computing device of the driver 603 exits a predetermined area, by detecting a decrease in weight at the driver's seat, by detecting a decrease in PIR or radar signal intensity, or by other suitable processes.

In the same scenario, the security device 101 determines that the infant 605 remains in the vehicle 601 following exit of the driver 603. In response to determining infant abandonment, the security device 101 executes a first level response action by activating a horn of the vehicle 601 and/or by transmitting an alert to the computing device of the driver 603. In response to determining that one or more predetermined factors are present (e.g., passage of predetermined time period, increase in temperature or carbon monoxide, etc.) and the infant 605 remains in the vehicle 601, the security device 101 executes a second level response action by transmitting an alert to local emergency services.

Figure 7:
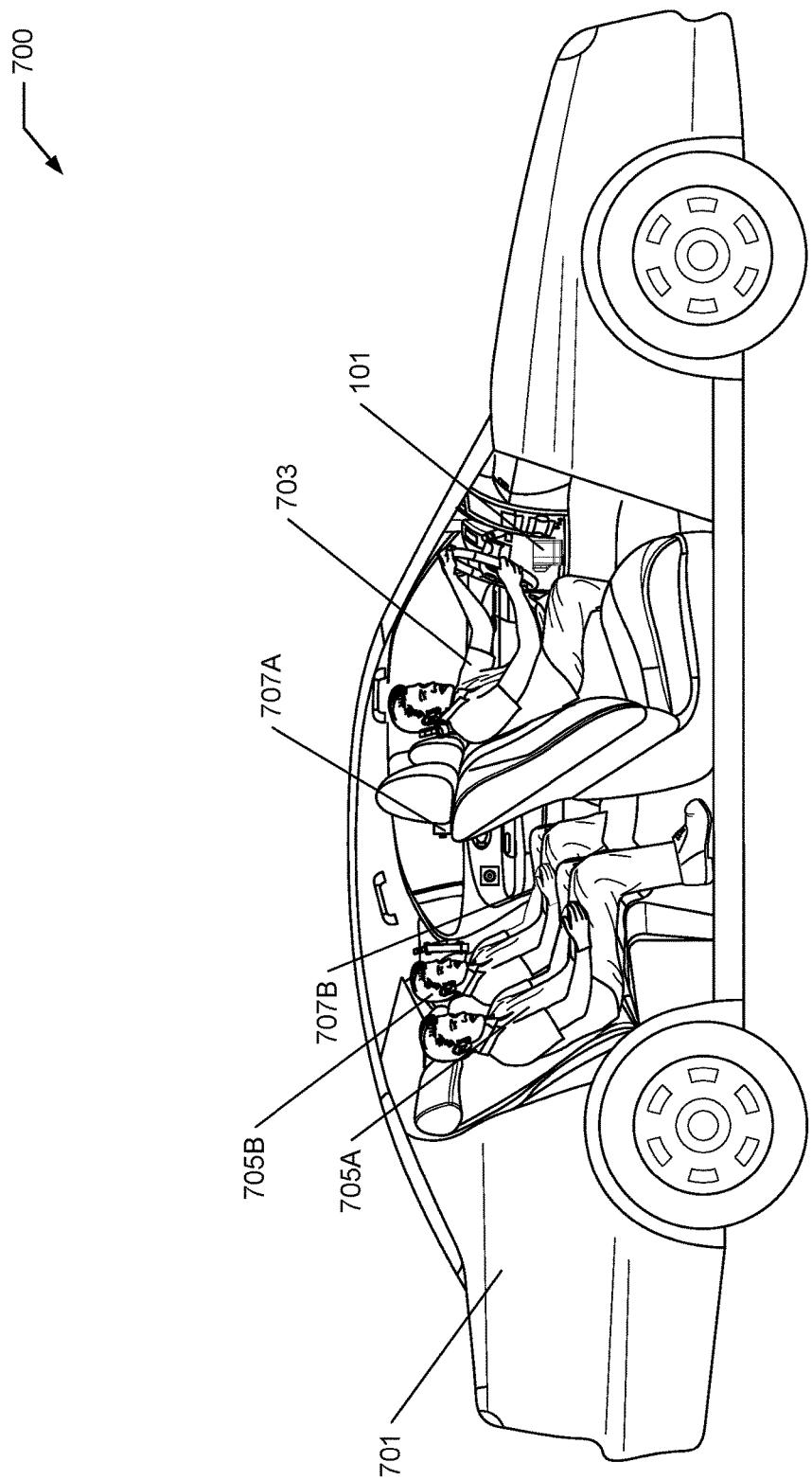
FIG. 7 also illustrates exemplary vehicle environments according to one embodiment of the present disclosure.

FIG. 7 shows an exemplary vehicle environment 700 including a vehicle 701 occupied by driver 703 and passengers 705A, 705B. A security device 101 and sensors 707A, 707B can be configured in the vehicle 701 to monitor the vehicle 701 and activities of the driver 703 and passengers 705A, 705B. In an exemplary scenario, based on increased audio readings from the sensor 707B, the security device 101 detects entrance of a teenage driver 703 and teenage passengers 705A, 705B into the vehicle 701. In the same scenario, the security device 101 receives images from the sensor 707A and determines that two faces are included in the images. The security device 101 computes a total passenger count of two and determines that the total passenger count violates a maximum passenger policy (e.g., one passenger). The security device 101 may identify passenger 705B as "Kevin" based on a list of friends with photos associated with the teen driver 703 (e.g., comparing an image of the passengers 705A, 705B to images uploaded by the parents, uploaded by another user, imported from a contact list of the teen/parent/user, from a social network friends list, from a third-party identification service, or through some other mechanism). The security device 101 can determine that "Kevin" is included on a list of troublesome individuals and generating a policy violation. In response to detecting the policy violation, the security device 101 logs the event and transmits an alert to a computing device of the driver 703 and/or an owner of the vehicle 701 (e.g., a parent of the driver 603).

Continuing the scenario, the security device 101 processes audio readings from the sensor 707B and detects blacklisted language including a swear word. The security device 101 also determines, based on location and accelerometer data received from the vehicle 701, that the vehicle 701 is operating in excess of posted speed limits and outside of a predetermined area, thereby violating predetermined speed and location policies. In response to detecting the various policy violations, the security device 101 generates and transmits a report of driver safety (e.g., including the policy violations) to a mobile computing device of a guardian or parent of the driver 703. Continuing the scenario, a security application running on the mobile computing device receives an input to initiate communication with the security device 101. In response, the security device 101 receives a command to initiate an audio feed between the security device 101 and the mobile computing device, thereby allowing the guardian or parent of the driver 703 to advise the vehicle occupants of their policy-violating behavior.

In some embodiments, the security device 101 communicates with a sensor or other computing device for monitoring a status of the driver 703. The security device 101 can communicate with, or have integrated within, a substance detection device, such as a breathalyzer, or a tracking device, such as a monitoring bracelet. In one example, the security device 101 alerts a predetermined entity, such as a parent, guardian, or legal authority, if the vehicle 701 is operated without receipt of a signal from a substance detection device. In another example, the security device 101 prevents ignition of the vehicle 701 in response to determining that readings from a breathalyzer device exceed a predetermined threshold (e.g., 0.10 blood alcohol content (BAC), 0.08 BAC, 0.04 BAC, etc.). As another example, the security device 101 may prevent ignition of the vehicle 701 or transmit a notification if a monitoring device (e.g., an ankle monitor) is within the vehicle 701 outside of a time window or geofence (e.g., a court ordered curfew or court order not to leave the state). In some embodiments, the security device 101 (or a system in communication therewith) updates and stores a log of sensor readings, such as, for example, a log of BAC readings from a breathalyzer device.

Figure 8:
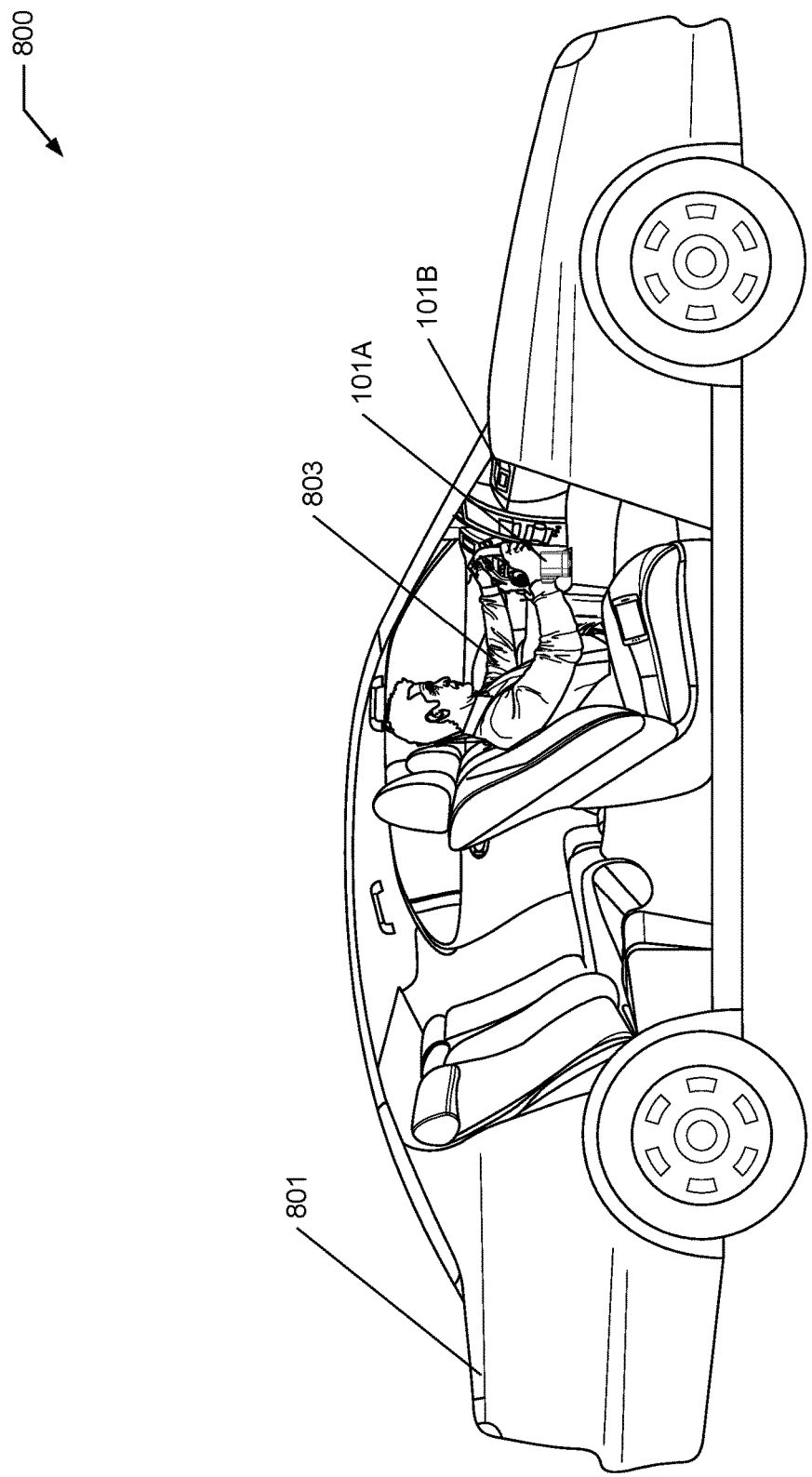
FIG. 8 also illustrates exemplary vehicle environments according to one embodiment of the present disclosure.

FIG. 8 shows an exemplary vehicle environment 800 including a vehicle 801 and a driver 803. Security devices 101A, 101B are configured in the vehicle 801. For example, the security device 101A installs into a cup holder and the security device 101B installs into an air conditioner vent. The security devices 101A, 101B can detect entrance and exit of the driver 803 and other activities occurring in or around the vehicle 801. In an exemplary scenario, the driver 803 is an elderly person that enters the vehicle 801 at 11:00 PM. The security device 101A detects the entrance of the driver 803 based on detecting opening and closing of the vehicle door and an increase in driver seat weight. The security device 101B, or a sensor in communication therewith, captures an image of the driver 803, processes the image, and confirms an identity of the driver 803 as the elderly person.

In the same scenario, the security device 101A detects vehicle ignition and the security device 101B determines that the driver 803 is operating the vehicle 801 outside of a predetermined window (e.g., 5:00 AM-9:00 PM). In response to detecting operation outside of the predetermined window, the security device 101B transmits an alert to a mobile computing device associated with a guardian of the driver 803 (e.g., a family member, caretaker, etc.). The security devices 101A, 101B monitor the driving performance of the driver 803 throughout vehicle operation. The security device 101A detects aggressive braking and acceleration behavior, and the security device 101B determines, based on captured facial images, that the driver 803 may be distracted or impaired (e.g., lack of focused gaze, etc.). The security devices 101A, 101B transmit a report of the driving behavior to a remote computing environment at which historical driving behavior of the driver 803 is stored. The remote computing environment retrieves and compares the historical driving behavior of the driver 803 to the received report. Based on the comparison, the remote computing environment generates a report of progressive driver health and safety, and transmits the report to the mobile computing device of the guardian and/or another entity (e.g., emergency services, an insurer, a physician, etc.).

Figure 9:
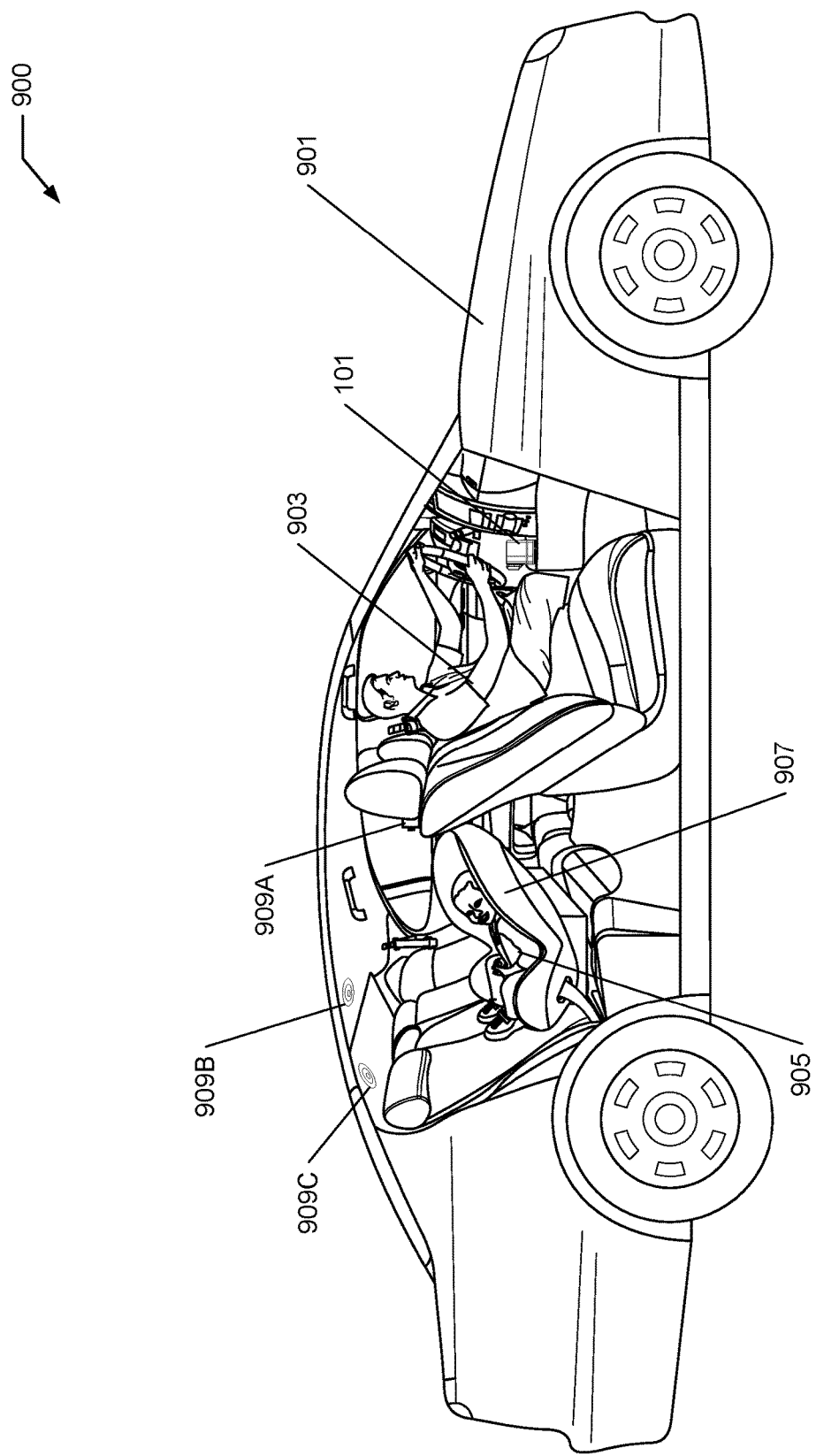
FIG. 9 also illustrates exemplary vehicle environments according to one embodiment of the present disclosure.

FIG. 9 shows an exemplary vehicle environment 900 including a vehicle 901 and a driver 903. A security device 101 can detect the presence of the driver 903, an infant 905, and/or an accessory 907, such as an infant seat. The security device 101 can receive and process readings from sensors configured within or around the vehicle 901, such as sensors 909A-C.

The accessory 907 can include a remote device or other element for communication with or detection by the security device 101 or sensors 909A-C. The device or other element can include, but is not limited to, passive or active radio frequency identification (RFID) elements and Bluetooth, WiFi, Zigbee, or other near field communication-enabled devices. In one example, the sensor 909B detects an RFID element of the accessory 907 when the accessory 907 moves within a predetermined proximity (e.g., 1 foot, 1 yard, etc.). In response to detection of the accessory 907, appropriate actions can be performed including, but not limited to, transmitting an alert, generating an effect at the security device 101 or vehicle 901, configuring properties of the security device 101 a sensor, generating a user interface, and requesting input from the driver 903. In one example, the monitor application 215 automatically configures the security device 101 and/or sensors 909A-C to an infant detection mode. In another example, the security application 215 automatically renders an alert on a mobile device 206, the alert prompting the driver 903 to inspect a status of the accessory 907 and/or infant 905.

Figure 10:
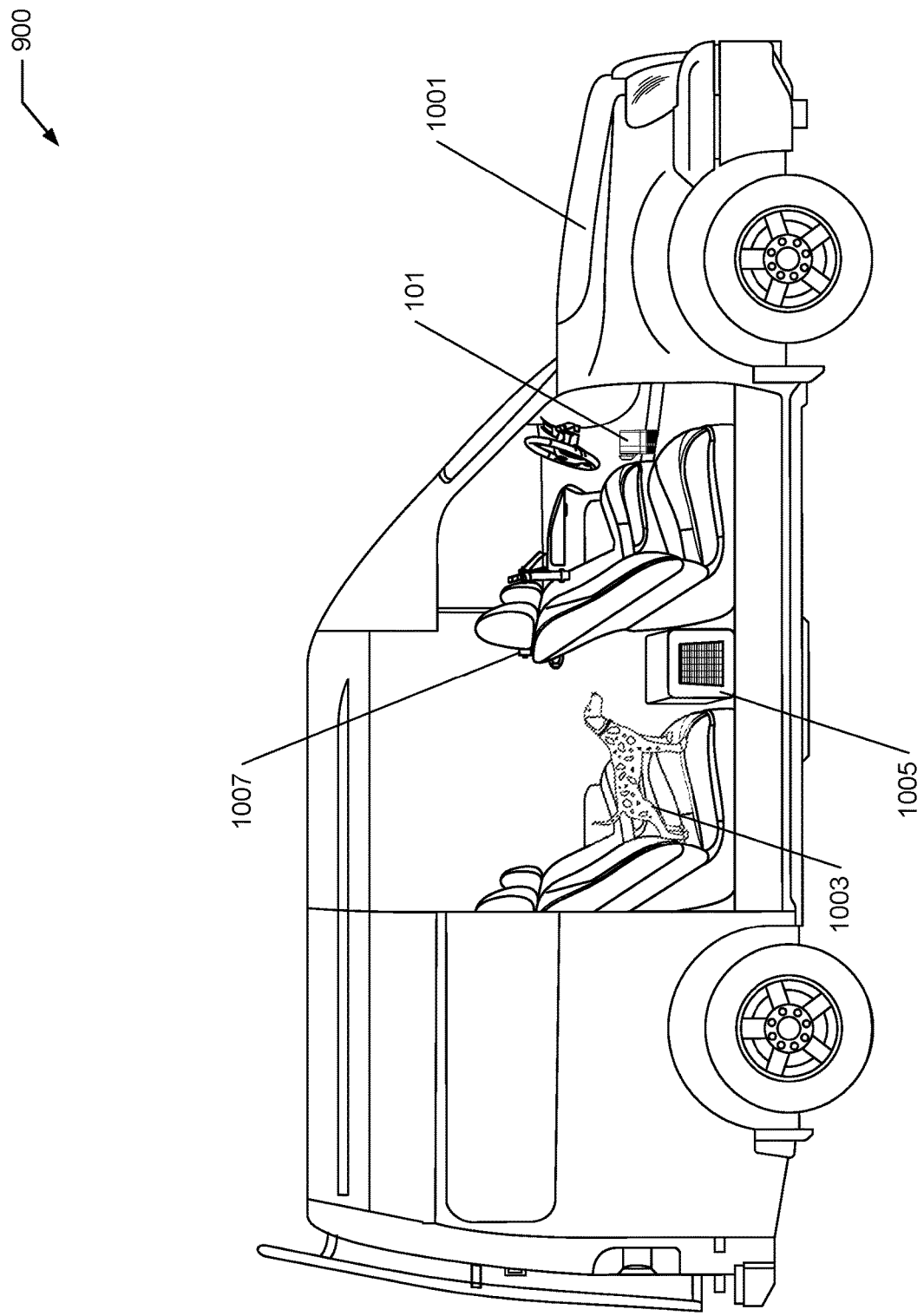
FIG. 10 also illustrates exemplary vehicle environments according to one embodiment of the present disclosure.

FIG. 10 shows an exemplary vehicle environment 1000 including a vehicle 1001 in which a security device 101 is configured. The security device 101 can detect the presence of an animal 1003, such as a dog, and an accessory 1005, such as a pet carrier. The security device 101 can receive and analyze readings from one or more sensors 1007 to detect the animal 1003 and/or accessory 1005. The sensor 1007 can detect a heat, radar, sonar, PIR, or other signal signature and, based thereon, the monitor application 215 can detect the presence or absence of the animal 1003. For example, the sensor 1007 captures radar readings of the vehicle 1001 interior at a first and a second time point, and the monitor application 215 determines that a difference between the first and second radar readings satisfies a predetermined threshold for detecting the animal 1003. The sensor 1007 can detect a remote device or other electronic element configured in or on the animal 1003 or accessory 1005. For example, the sensor 1007 detects an RFID chip embedded in a collar of the animal 1003. In another example, the sensor 1007 reads a near field communication element configured in or on the accessory 1005.

In response to detecting the animal 1003, accessory 1005, and/or a driver (not shown), various actions can be performed. The monitor application 215 can configure the security device 101 and/or sensor 1007 to a pet mode. The monitor application 215 can stream sensor readings, such as a virtually live video stream, to a networking address and the security application 251 can access the networking address to provide animal monitoring in virtually real time. The monitor application 215 can determine that current or forecasted conditions of the vehicle 1001 may be harmful to the animal 1003. For example, the monitor application 215 communicates with an external weather reporting system and determines that a forecasted external temperature may heat the vehicle 1001 in excess of a predetermined threshold. In another example, the monitor application 215 computes a rate of vehicle interior temperature increase and determines that the rate exceeds a predetermined safety threshold. The monitor application 215 can perform various response actions including, but not limited to, transmitting alerts, unlocking the vehicle 1001, activating a horn or sound system, generating effects at the security device 101, starting the vehicle 1001, and activating an air conditioner of the vehicle 1001. In one example, in response to determining that the animal 1003 has been left in the vehicle 1001 for a first time period, the monitor application 215 automatically transmits an alert to a computing device 206. In the same example, in response to determining that the animal 1003 remains in the vehicle 1001 for a second time period, the monitor application 214 automatically transmits an alert to local emergency services.

Figure 11:
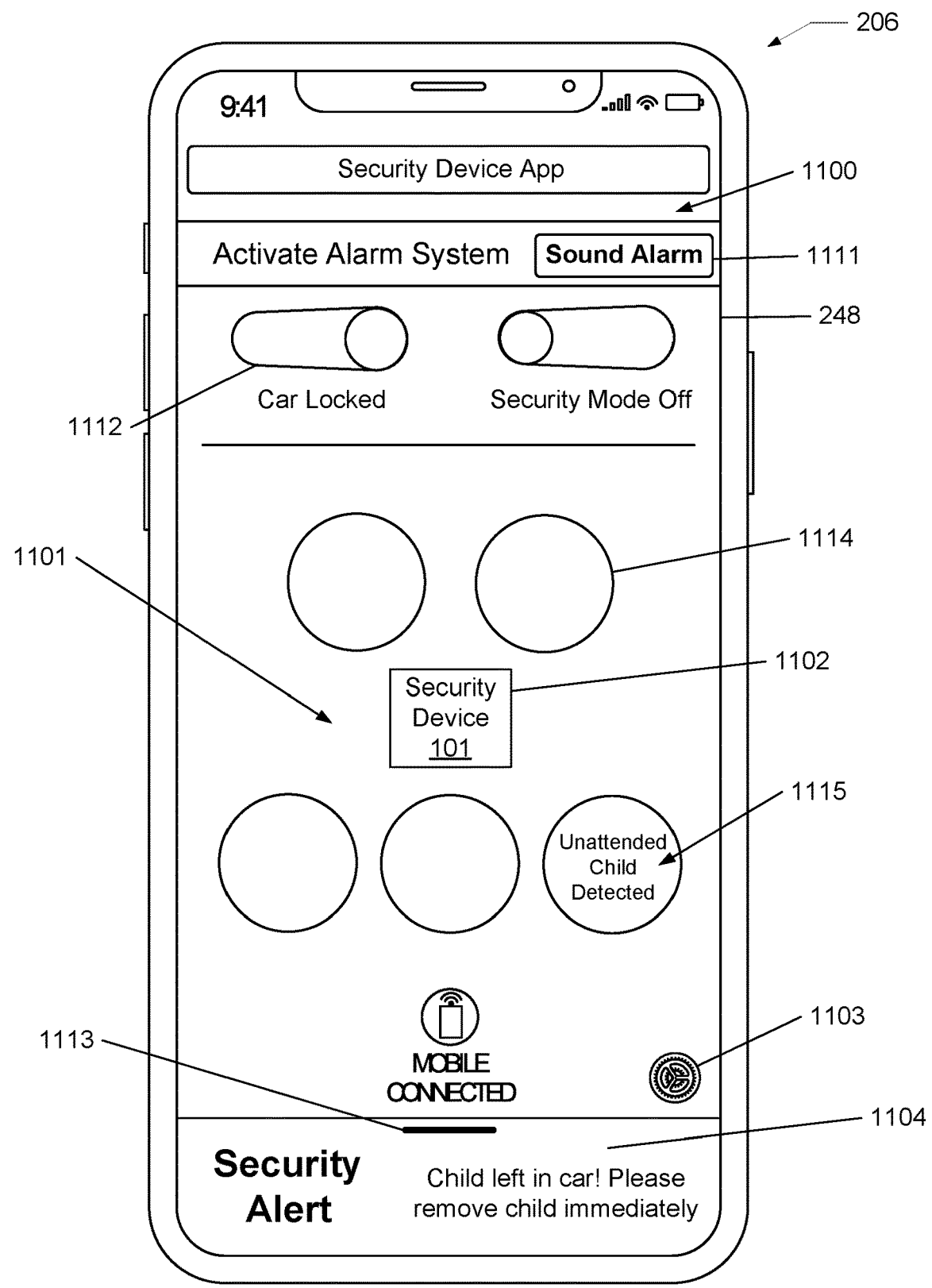
FIG. 11 illustrates an exemplary user interface on the mobile device according to on embodiment of the present disclosure.

Referring now to FIG. 11, illustrated is an exemplary user interface 1100 on the mobile device 206, according to one embodiment of the present disclosure. In various embodiments, the user interface 1100 is displayed on the mobile device 206 through the display 248. The user interface 1100 can present the user with a variety of setting and features related to the security device 101. The user interface 1100 can display information gathered from various sources located on the network 212. For example, the mobile device 206 can aggregate live video feed recorded by the security device 101 and display the live video feed on the user interface 1100. In another example, the mobile device 206 can receive data analytics processed by the computing environment 203 and display it on the user interface 1100.

In at least one embodiment, the user interface 1100 can include a seat map 1101, a security device toggle 1102, a settings icon 1103, and a notification banner 1104. The seat map 1101 can illustrate a digital rendition of the seats of the vehicle 204 being monitored by the security device 101. For example, in a five seat car, the seat map 1101 can include a driver seat to the front left or front right (depending on region) and four remaining passenger seats. The seat map 1101 can include seats 1114 that represent each seat in the vehicle. In some embodiments, each seat 1114 is selectable to display particular attributes of the selected seat. For example, when the driver seat is selected, the user interface 1100 can display a pop up that details the unique attributes of that position. In another example, the rear passenger seat with an infant can be selected, where the user interface 1100 can display a live video recording of the current selected seat and describe any identifiable features of the video. In particular embodiments, the seat map 1101 can include a seat notification 1115. A seat notification 1115 can be any recognizable phrase or symbol that describes an attribute of the particular seat 1114. Seat notifications can include, but are not limited to, text, check marks, cross signs, unbuckled seatbelt symbols, buckled seatbelt symbols, and specific colors. The seat notification 1115 can be displayed inside of the seat 1114. In various embodiments, the seat 1114 can vary in color and have colored outlines that correspond to particular events. For example, if an infant is left in the vehicle 204, the boarders of the seat 1114 will flash a bright red color.

The user interface 1100 can display the location of the security device 101 relative to the vehicle it sits in through the security device toggle 1102. The security device toggle 1102 can be a selectable icon that displays attributes of the security device 101. For example, the user interface 1100 can display all live sensor readings after selecting the security device toggle 1102. In another example, the user interface 1100 can display a voice command feature after selecting the security device toggle 1102. After selecting the voice command feature, the user can press a speech button (not pictured) on the user interface 1100, which activates the microphone of the mobile device 206. Continuing this example, the user can speak into the mobile device 206 while holding the speech button and the mobile device 206 can transmit the audio in real time through the speakers of the security device 101.

In certain embodiments, the settings icon 1103 is a selectable button that allows the user to change settings related to the environment. Particular settings can include, but are not limited to, time, date, user preferences, user profile details, security settings, networked environment 200 settings, mobile device 206 settings, user interface 1100 settings, security device 101 settings, power controls, and vehicle 204 settings. After selecting the settings icon 1103, the user interface 1100 can display a new screen with various setting options.

The notification banner 1104 can display any pertinent information to the user. The notification banner can include a slide icon 1113, which can be activated by swiping up the display 248. Toggling the slide icon 1113 can display greater information related to the particular notification by providing a larger area to display information. For example, the user interface 1100 can display a security alert through the notification banner 1104. Continuing this example, if a user leaves a child in the vehicle 204, the notification banner 1104 can display "Child left in car! Please remove child immediately". By activating the slide icon 1113 in this particular scenario, the user interface 1100 can display live feed of the child left in the vehicle 204.

The user interface 1100 can include an alarm toggle 1111 and various switch toggles 1112. By selecting the alarm toggle 1111, the mobile device 206 can send an alarm alert to the security device 101. In some embodiments, the security device 101 will activate an alarm when the alarm toggle 1111 is activated. In some embodiments, the switch toggles 1112 can activate or deactivate any particular aspect of the vehicle 204, the security device 101, or any other particular device connected to the networked environment 200. For example, a switch toggle 1112 can be used to lock or unlock the car. In another example, a switch toggle 1112 can be used to activate or deactivate the security mode of the security device 101. In various embodiments, the switch toggles 1112 can be a variable scale instead of a binary choice between on or off. For example, a switch toggle 1112 can change the speaker output volume of the security device 101. Continuing this example, the switch toggle 1112 can be moved continuously from no sound to max sound for the security device 101.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A method, comprising:
   capturing, via at least one image sensor, a plurality of video frames corresponding to a vehicle;
   reading, via at least one computing device, a plurality of measurements from at least one additional sensor;
   determining, via the at least one computing device, that a driver has exited the vehicle;
   in response to determining that the driver has exited the vehicle, determining, via the at least one computing device, that a particular event has occurred in a particular seat of the vehicle by analyzing the plurality of measurements and the plurality of video frames based on event configuration data; and
   in response to determining that the particular event has occurred, performing, via the at least one computing device, at least one remedial action comprising causing a user interface to be rendered on a mobile device of a user comprising a plurality of icons individually associated with a respective seat of a plurality of seats of the vehicle, wherein a particular icon of the plurality of icons associated with the particular seat comprises a seat notification corresponding to the particular event.

2. The method of claim 1, wherein the at least additional one sensor comprises an infrared camera and the method further comprises:
   reading, via the at least one computing device, a plurality of infrared frames from the infrared camera;
   identifying, via the at least one computing device, an area with a thermal variance in at least one of the plurality of infrared frames; and
   monitor a temperature of the area with the thermal variance, wherein determining that the particular event has occurred further comprises determining that the temperature of the area exceeds a temperature threshold.

3. The method of claim 1, further comprising:
   monitoring, via the at least one computing device, to determine whether the particular event has ended; and
   performing, via the at least one computing device, a plurality of additional remedial actions over time until the particular event ends.

4. The method of claim 1, further comprising determining a temperature in the vehicle exceeds a predetermined temperature threshold based on the plurality of measurements, wherein the at least one remedial action is further performed in response to the temperature exceeding the predetermined temperature threshold.

5. The method of claim 1, further comprising:
   monitoring a length of time since the particular event started; and
   determining that the length of time exceeds a time threshold, wherein the at least one remedial action is further performed in response to the length of time exceeding the time threshold.

6. The method of claim 1, wherein the particular event comprises one of: a child being left in the vehicle or a pet being left in the vehicle.

7. The method of claim 1, wherein the at least one remedial action comprises generating an alert on the mobile device associated with an administrative user.

8. A system, comprising:
   a data store comprising event configuration data;
   at least one sensor configured to sense at least one type of measurement corresponding to a vehicle; and
   at least one computing device coupled to the at least one sensor, the at least one computing device configured to:
   read a plurality of measurements from the at least one sensor;
   determine that a driver has exited the vehicle;
   in response to determining that the driver has exited the vehicle, determine that a particular event has occurred in a particular seat of the vehicle by analyzing the plurality of measurements based on the event configuration data; and
   in response to determining that the particular event has occurred, perform at least one remedial action comprising causing a user interface to be rendered on a mobile device of a user comprising a plurality of icons individually associated with a respective seat of a plurality of seats of the vehicle, wherein a particular icon of the plurality of icons associated with the particular seat comprises a seat notification corresponding to the particular event.

9. The system of claim 8, further comprising a body of a sensing device, wherein the at least one sensor and the at least one computing device are disposed within the body and the body is configured to be affixed to an interior of the vehicle.

10. The system of claim 8, wherein the at least one sensor comprises a camera, the particular event comprises leaving an infant in the vehicle, and the at least one computing device is configured to analyzing the plurality of measurements by performing image analysis on a plurality of frames from the camera to identify the infant in the vehicle.

11. The system of claim 8, wherein the at least one sensor comprises a camera, the particular event comprises leaving a pet in the vehicle, and the at least one computing device is further configured to determine that the particular event has occurred by analyzing the plurality of measurements by:
    performing image analysis on a plurality of frames from the camera to identify the pet in the vehicle;
    monitoring the pet in the vehicle in the plurality of frames over a period of time;
    determining that the period of time exceeds a time threshold; and
    determining that the particular event has occurred responsive to the period of time exceeding the time threshold.

12. The system of claim 11, wherein the at least one computing device is further configured to:
    enter into an armed mode in response to the pet being identified in the vehicle; and
    determine an intrusion into the vehicle while in the armed mode.

13. The system of claim 8, wherein the at least one computing device is configured to performing the at least one remedial action by:
    initiating a video call to the mobile device associated with a particular user account;
    streaming an audio and video feed of an interior of the vehicle to the mobile device; and
    outputting, via a speaker in the interior of the vehicle, an audio signal from the mobile device.

14. The system of claim 8, wherein the at least one sensor comprises a microphone, the particular event comprises leaving an infant in the vehicle, and the at least one computing device is configured to analyzing the plurality of measurements by performing audio analysis on an audio stream from the microphone to identify the infant in the vehicle.

15. A non-transitory computer-readable medium embodying a program that, when executed by at least one computing device, causes the at least one computing device to:

read a plurality of measurements from at least one sensor configured to sense at least one type of measurement corresponding to a vehicle;

determine that a driver has exited the vehicle;

in response to determining that the driver has exited the vehicle, determine that a particular event has occurred in a particular seat of the vehicle by analyzing the plurality of measurements based on event configuration data stored in a memory associated with the at least one computing device; and perform at least one remedial action comprising causing a user interface to be rendered on a mobile device of a user comprising a plurality of icons individually associated with a respective seat of a plurality of seats of the vehicle, wherein a particular icon of the plurality of icons associated with the particular seat comprises a seat notification corresponding to the particular event based on the particular event occurring.

16. The non-transitory computer-readable medium of claim 15, wherein the at least one sensor comprises a camera and the program further causes the at least one computing device to:

read the plurality of measurements from the at least one sensor comprises receiving a plurality of video frames from the camera; and track a movement pattern of a pet within a subset of the plurality of video frames.

17. The non-transitory computer-readable medium of claim 15, wherein the program further causes the at least one computing device to:

analyze a plurality of frames from a camera device, wherein the at least one sensor comprises the camera device;

identify an animal in at least one frame of the plurality of frames; and determine a current temperature in the vehicle meets or exceeds a predefined threshold stored in the event configuration data, wherein determining that the particular event has occurred is responsive to the animal being identified and the current temperature in the vehicle meeting or exceeding the predefined threshold.

18. The non-transitory computer-readable medium of claim 15, wherein the at least one remedial action comprises starting the vehicle.

19. The non-transitory computer-readable medium of claim 15, wherein the at least one remedial action comprises at least partially opening at least one window in the vehicle.

20. The non-transitory computer-readable medium of claim 15, wherein the program further causes the at least one computing device to determine a last driver of the vehicle, wherein the at least one remedial action comprises sending an alert to the mobile device associated with the last driver.

* * * * *